US012354394B2

(12) United States Patent
Anzenberg et al.

(10) Patent No.: US 12,354,394 B2
(45) Date of Patent: Jul. 8, 2025

(54) NATIVE AUTOMATIC FIELD EXTRACTION AT A USER DEVICE

(71) Applicant: BILL Operations, LLC, San Jose, CA (US)

(72) Inventors: Eitan Anzenberg, Piedmont, CA (US); Dalton Purnell, Berthoud, CO (US); Corby Campbell, South Jordan, UT (US); Darin Dooley, Grove, UT (US); Amol Jayant Thatte, Simi Valley, CA (US); Jay Daniel Dunbar, Raleigh, NC (US); Craig Jon Pickett, Lehi, UT (US); Derrick Jacob Hathaway, Providence, UT (US); Bei Zhang, San Jose, CA (US)

(73) Assignee: BILL Operations, LLC, San Jose, CA (US)

( * ) Notice: Subject to any disclaimer, the term of this patent is extended or adjusted under 35 U.S.C. 154(b) by 121 days.

(21) Appl. No.: 17/891,844

(22) Filed: Aug. 19, 2022

(65) Prior Publication Data

US 2024/0062571 A1 Feb. 22, 2024

(51) Int. Cl.
*G06F 40/30* (2020.01)
*G06V 30/14* (2022.01)
*G06V 30/412* (2022.01)

(52) U.S. Cl.
CPC .......... *G06V 30/412* (2022.01); *G06F 40/30* (2020.01); *G06V 30/1456* (2022.01)

(58) Field of Classification Search
CPC ..... G06F 16/951; G06F 40/30; G06K 7/1413; G06K 7/1417; G06N 5/01; G06N 3/09; G06N 3/084
See application file for complete search history.

(56) References Cited

U.S. PATENT DOCUMENTS 11,755,668 B1 * 9/2023 Stewart ............... G06N 3/09
707/709
11,977,952 B1 * 5/2024 Golchha ............ G06K 7/1413
(Continued)

OTHER PUBLICATIONS

International Search Report and Written Opinion received for PCT Patent Application No. PCT/US2023/030539, mailed on Jan. 8, 2024, 21 pages.

*Primary Examiner* — Vijay B Chawan
(74) *Attorney, Agent, or Firm* — Shook, Hardy & Bacon L.L.P.; Joseph W. Cruz

(57) ABSTRACT

Particular embodiments receive a plurality of values associated with a document. One or more keywords associated with the document are also received. A first score is generated for each value, of the plurality of values. The generation of the first score excluding sending, over a computer network, a first request to one or more remote computing devices to generate the first score. Based at least in part on the generating of the first score, each value, of the plurality of values is ranked. The ranking of each value excluding sending, over the computer network, a second request to the one or more remote computing devices to rank each value. Based on the ranking, at least one value, of the plurality of values, is selected. The selecting being indicative that the at least one value is a candidate to be a constituent of the one or more keywords. Based on the ranking, an indicator indicating that the at least one value is the candidate to be the constituent of the one or more keywords is presented.

18 Claims, 12 Drawing Sheets

(56) References Cited

U.S. PATENT DOCUMENTS

| | | | |
|---|---|---|---|
| 2013/0273968 A1* | 10/2013 | Rhoads | H04W 4/50 |
| | | | 455/566 |
| 2019/0220544 A1* | 7/2019 | Khanna | G06F 16/9558 |
| 2020/0117944 A1* | 4/2020 | Duta | G06V 30/224 |
| 2021/0133498 A1* | 5/2021 | Zhang | G06F 18/28 |
| 2023/0297629 A1* | 9/2023 | Stewart | G06Q 10/06398 |
| | | | 707/709 |
| 2024/0062571 A1* | 2/2024 | Anzenberg | G06V 30/41 |

\* cited by examiner

FIG. 5B.

NATIVE AUTOMATIC FIELD EXTRACTION AT A USER DEVICE

BACKGROUND

Existing computer applications and models are configured to process natural language characters in documents (e.g., digital books, letters, etc.). For example, some back-end document processing technologies call remote natural language processing (NLP) services in order to determine the semantic meaning of words in a natural language sentence of a document. However, these existing technologies and others unnecessarily consume computer resources (e.g., they are high in latency), are not intelligently automated, and employ static user interfaces and human-computer interaction, among other technical problems.

BRIEF SUMMARY

Particular embodiments of the present disclosure include a computer-implemented method, a non-transitory computer storage medium, and a system directed native automatic field extraction at a user device. In operation, the user device receives a plurality of values that have been parsed (e.g., via OCR) from a document (e.g., a receipt or invoice image). The plurality of values include natural language words and/or numerical characters. The user device determines, at the document, a location of each value relative to an indication of one or more keywords. For example, the user device can determine a direction and distance (e.g., a cosine distance) that the keyword "total amount" is from a particular dollar amount value. Based on such location and a first rule, the user device generates a first score for each value, where the first score is at least partially indicative of whether each respective value is within a threshold position relative to the indication of the one or more keywords.

Based on at least a second rule, the user device generates one or more second scores for each value. For example, a particular dollar amount value may be scored the highest among other values because of the dollar sign symbol ($), the decimal point, and the fact that the value includes all numbers and no natural language words. The user device additionally aggregates (e.g., sums up or multiplies) the first and second scores to generate a total score for each value. The user device then ranks each value according to the total score for each value. Based on the ranking, the user device then selects at least one value and presents a corresponding indicator, which is indicative that the at least one value is the candidate to be the constituent of the one or more keyword. For instance, the user device can select a highest ranked dollar amount value as a candidate to belong to the keyword "total amount," where the dollar amount value is highlighted with a particular superimposed pixel value indicating that such value is a "total amount."

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 5B is a screenshot illustrating the different key-value pairs that have been located at the snapshot of FIG. 5A, according to some embodiments.

DETAILED DESCRIPTION

Figure 1:
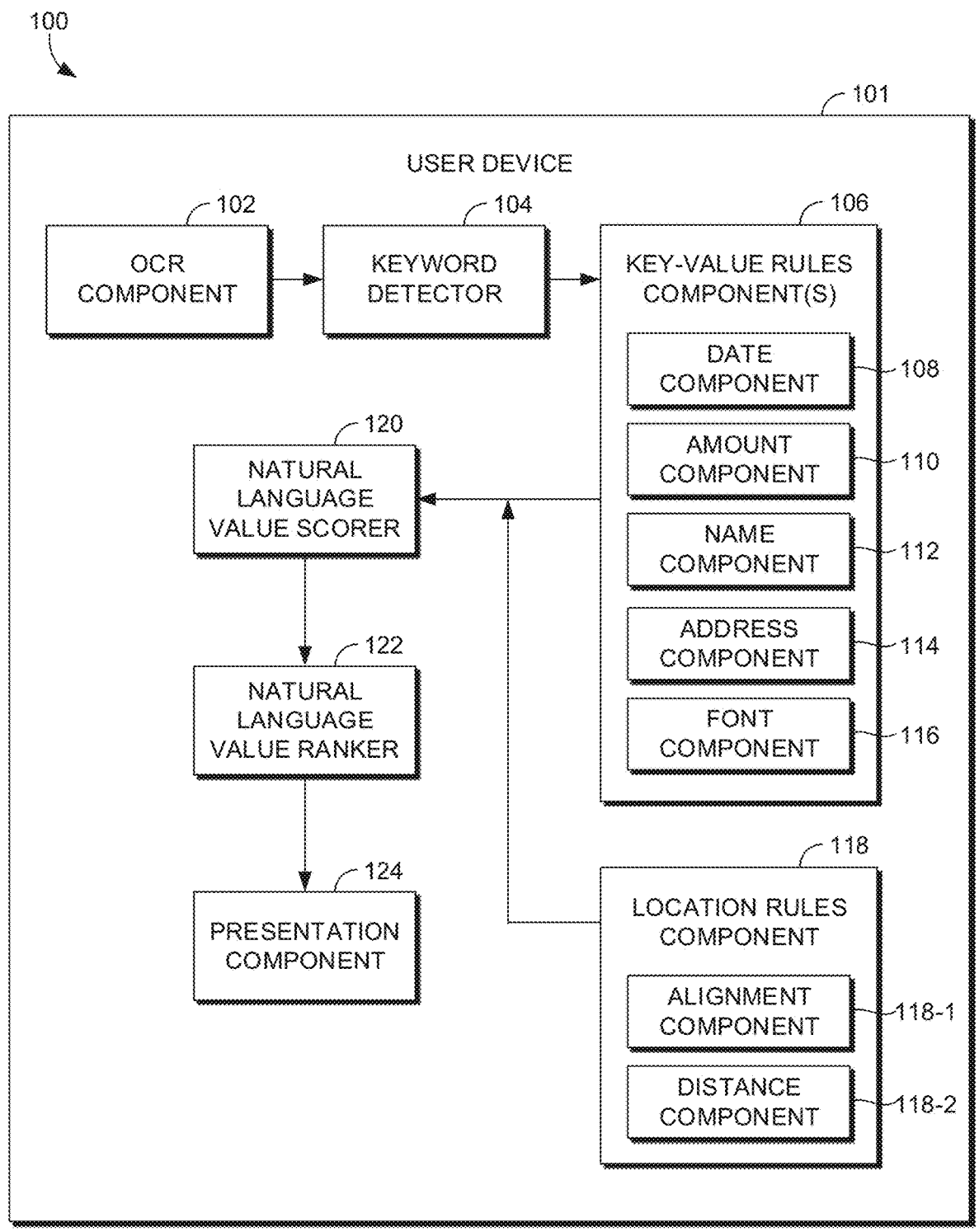
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described Existing technologies are deficient in terms of computing resource consumption. For example, existing field extraction technologies that use Optical Character Recognition (OCR), NLP, or machine learning models are high in latency. Field extraction is the concept of extracting specific fields (e.g., names, addresses, etc.) of data from a larger dataset in order to make use of the data. However, these technologies typically capture, at a mobile device, an image of a document with a mobile application, and then make calls, over a computer network (e.g., a Wide Area Network (WAN)), to one or more remote computing devices (e.g., cloud nodes). These remote computing devices then responsively run complex machine learning models and other functionality to predict field data. Subsequently, these remote computing devices then call back, over the computer network, the mobile device with the results. Each call, however, whether from the mobile device or remote computing devices, requires populating data packets with payload data and supplemental header information or other metadata via TCP/IP or other network protocols. Additionally, at runtime, typical machine learning models assess millions of parameters and are computationally expensive. Accordingly, the generating of the data packets, the sending of the data packets across a computer network, and running data through machine learning models to extract fields of data increases network latency.

Additionally, because existing technologies require the generation and sending of data packets over a computer network for field extraction, network bandwidth and I/O are also negatively impacted. Image processing of documents, for example, is expensive to process because each image contains a lot of pixel value data that is typically converted into a computer-readable format to be processed by a model. Accordingly, for a given application, there may be several bits dedicated to, for example, converting an image into a set of corresponding vectors in preparation for model processing, performing natural language processing for words in the image, performing actual model processing to predict values of fields, and the like. Accordingly, in the same network there are fewer bits available for a given time period to perform other tasks because of the heavy computational needs, thereby negatively impacting network bandwidth. Similarly, model processing causes excessive storage devices (e.g., disk) I/O. There are I/O costs (e.g., excess physical read/write head movements on non-volatile disk) because each time a model processes a word, the computing system has to reach out to the storage device to perform a read or write operation, which is time consuming, error prone, and can eventually wear on components, such as a read/write head. For example, because Long Short Term Memory (LSTM) models encode and predict natural language characters sequentially, each encoding or prediction requires an I/O step.

Moreover, while NLP-based models (e.g., Bidirectional Encoder Representations from Transformers (BERT)) have led to significant advances, they often have several hundred millions of parameters. This trend towards larger models raises several concerns. First is the cost of exponentially scaling these models' computational requirements. Second, these large models require extensive computational and memory requirements. This is because all of these parameters must be stored in memory and analyzed at runtime and training to make predictions, making the overhead extensive and unnecessary. Lastly, there are efficiency costs with training existing models. That is, these models take a vast quantity of time to train and deploy in a production environment. This is because most parameters are learned from scratch, taking many epochs and training sessions. For this reason, many technologies cannot or do not employ native machine learning models at a user device.

Some existing technologies also statically require extensive manual user input and have limited functionality. For example, in order to determine whether a piece of data belongs to a certain field or in order to extract the piece of data, some existing technologies, such as spreadsheet applications, require users to manually input data in a field representing a certain predefined category. For example, if a user wanted to sum up a set of numbers of a receipt in order to derive the total amount, a spreadsheet application would have to receive and store, in computer memory, a user-generated string indicative of a "total amount." These technologies would then have to manually receive, based on more additional user input, individual numerical values of the set of numbers on the receipt under the "total amount" column. Then, in response to receiving yet another manual user request to perform a summation or other function, these technologies then summarize or otherwise combine the values. Such functionality not only increases storage device I/O, but it is tedious and leads to inaccuracies because of the repetitive manual user input requirements of the values to the same field.

Some existing technologies employ static user interfaces and otherwise negatively impact human-computer interaction. One example illustration is the spreadsheet applications described above. These user interfaces are non-intuitive to use, especially with respect to computing different functions. The user typically has to memorize or input different code sequences to perform a given function, which is tedious. In another example, other user interfaces require extensive drilling or other user input to work for field extraction, thereby making navigation and use tedious and burdensome. Moreover, in order to process images of documents, no existing technologies aid the user in an intelligent way to ensure the image is properly captured or intelligently present indicators (e.g., a virtual reality (VR) overlay) to users to inform them that certain data sets (e.g., a number) belongs to a certain field (e.g., a total amount). This leads to processing or other accuracy errors. For example, a user may have a tangible paper that has many wrinkles (making the characters ineligible) or is too far away from an image sensor to make out the characters. However, these technologies may still try to process the document and make extraction predictions. But since these technologies do not ensure that the image is properly captured, they can make inaccurate predictions. Accordingly, human-computer interaction and accuracy is negatively impacted.

Various embodiments of the present disclosure provide one or more technical solutions to the technical problems described above, as well as other problems. Specifically, various embodiments of the present disclosure are directed to native automatic field extraction at a user device. In operation, particular embodiments receive a plurality of values that have been parsed (e.g., via OCR) from a document (e.g., a receipt or invoice), where the plurality of values include natural language words and/or numerical characters. Some embodiments receive one or more keywords associated with the document. For example, a keyword (corresponding to a field name or category) may be "total amount." Some embodiments determine, at the document, a location of each value relative to an indication of the keyword. For example, some embodiments determine a direction and distance (e.g., cosine distance) that the keyword "total amount" is from a value that reads "$200.00." Based on such location and a first rule, some embodiments generate a first score for each value, where the first score is at least partially indicative of whether each respective values is within a threshold position relative to the one or more keywords. For example, the highest score may be given to the "$200.00" value (and not the "5" value) because it is directly to the left of and at the same height as the "total amount" keyword, as opposed to being outside of a distance threshold and not aligned. In some embodiments, such generation of the first score excludes sending, over a computer network, a request to a remote computing device (e.g., a cloud node) to generate the first score, which is indicative that the generation of the score occurs natively at the user device.

Based on at least a second rule, some embodiments generate one or more second scores for each value, where the second score is also generated natively at the user device.

For example, using the illustration above, the "$200.00" value may be scored the highest among other values because of the dollar sign indicator ($), the decimal point, and the fact that the value includes all numbers and no natural language words. Likewise, for example, values, such as "tip" are scored lower because they do not include a dollar sign indicator, a decimal point, and is a natural language word instead of a number. Some embodiments additionally aggregate the first and second scores to generate a third (e.g., total) score for each value. For example, some embodiments sum up, multiply, and/or otherwise linearly combine the first score and the second score. Some embodiments then rank each value based on the generating of the third score for each value. For example, using the illustration above, the value "$200.00" may be ranked higher than the "tip" value because its score is higher, which is indicative that such value is a candidate (or better candidate) to be a constituent of the "total amount" keyword. Based on the ranking, some embodiments then select at least one value, which is indicative that the at least one value is the candidate to be the constituent of the keyword.

Based on the ranking, some embodiments present an indicator at a user device, where the indicator indicates that the selected value is a candidate to be the constituent of the keyword. For example, using the illustration above, some embodiments superimpose colored pixel values over the "$200.00" at an image of the document, which indicates that this value is a "total amount" or belongs to the "total amount" keyword/category.

Various embodiments of the present disclosure improve existing technologies and computer processes via particular technical solutions. For example, particular embodiments improve computing resource consumption by reducing latency. Instead of making and receiving multiple calls, over a computer network, to and from one or more remote computing devices (e.g., cloud nodes) and running complex machine learning models on such remote computing devices, particular embodiments automatically and natively perform field extraction at the user device (e.g., a mobile phone) without making any calls to any remote computing devices. Accordingly, one technical solution is the exclusion of sending or transmitting, over a computer network, a request to one or more remote computing devices to generate any of the scores described herein (or any functionality). Consequently, unlike existing technologies, particular embodiments do not populate data packets with payload data and supplemental header information or other metadata via TCP/IP or other protocol networks. Accordingly, by avoiding the generation of the data packets, the sending the data packets across a computer network, and running data through machine learning models at the back-end to extract fields of data, these embodiments reduce network latency.

Additionally, because some embodiments do not require the generation and sending of data packets over a computer network for field extraction, network bandwidth is also increased. Accordingly, for a given application, instead of dedicating several bits to, for example, converting an image into a set of corresponding vectors in preparation for model processing, performing natural language processing for words in the image, and performing actual model processing to predict values of fields, all of these bits are saved because the field extraction is done natively at a user device instead of over a computer network at remote computing device. Therefore, there are more bits available to perform other tasks on a network because computational tasks are done natively, thereby increasing network bandwidth.

Moreover, some embodiments improve I/O and memory consumption relative to existing technologies. As described above, existing LSTMs cause I/O problems and existing BERT models often train on several hundred million parameters, which is costly in terms of computation and memory. Various embodiments of the present disclosure improve these models by employing modified BERT models or encoders, which in some embodiments, are compressed or smaller versions of regular models. For instance, these compressed models can use millions of fewer parameters using knowledge distillation or other functionality, as described in more detail below. Accordingly, because there are substantially less parameters to work from, not as much data is stored to memory, and the computational cost (e.g., latency, I/O, CPU utilization, etc.) is much lower. Further, these models can be trained and deployed quicker in a production environment because fewer parameters are learned from scratch, taking fewer epochs or training sessions. In this way, particular embodiments employ native machine learning models at a user device because they are compressed, which reduces computing overhead otherwise associated with denser models. Accordingly, another technical solution is the use of one or more compressed machine learning models stored at a user device.

Some embodiments improve existing technologies because they perform automatic field extraction based on one or more new rules. For example, unlike the existing spreadsheet applications described herein, particular embodiments do not require manual user input (e.g., a field name string, dragging, or inputting data values to the field name, etc.) to associate a value with a field and perform resulting computations. Rather, another technical solution according to some embodiments is the automatic generation of one or more scores for each value based on one or more rules—e.g., a location of the value relative to the keyword, whether certain symbols (e.g., a forward slash symbol (/), a dash symbol (e.g., -), a dollar sign symbol (e.g., "$"), a month indicator, a decimal point in the value, etc.) are present. In an illustrative example, a keyword can include the word "date" and a rule can include a policy to increment a score if there is one or more of: a forward slash symbol, a dash symbol, a month indicator, or year indicator in each value, where the selection of a value is indicative that the value is a candidate to be the date. In another illustrative example, a set of keywords can include the words "total amount" and a rule may include a policy to increment the score if there is one or more of: a dollar sign symbol, a number, a decimal point, or a currency code in each value. The selection of a value may be indicative that the value is a candidate to be the total amount.

Additional or alternative technical solutions are the use of such score(s) to then rank and select a value that is a candidate to be a constituent of a keyword (e.g., the value "$200.00" belongs to the "total amount" keyword). No existing technologies perform such automated functionality based on the rules, which are described in more detail herein. Such functionality additionally decreases storage device I/O, is less tedious, and is more accurate because there are no repetitive manual user input requirements of the values to the same field.

Some embodiments improve the user interfaces and human-computer interaction relative to existing technologies. For example, unlike a spreadsheet applications, particular embodiments employ user interfaces that are intuitive to use. For instance, instead of the user having to memorize or input different code sequences to perform a given function for field extraction, as is the case with spreadsheet technologies, particular embodiments automatically perform field extraction by automatically generating scores and the rest of the functionality to select a value to be a candidate to be a constituent of a keyword. In another example, particular embodiments do not require extensive drilling or other user input to work for field extraction, thereby making navigation and use less tedious and burdensome. For example, some embodiments present each keyword (e.g., "date" "total amount" "vendor") and their corresponding values at the same user interface page to the user.

Moreover, with respect to improved human-to-computer interaction, accuracy, and user interfaces, unlike existing technologies, some embodiments aide the user by intelligently ensuring that the image is properly captured or in view. For example, some embodiments superimpose colored pixels (e.g., a VR overlay) at an image of a document or otherwise indicate whether a document is in view (or the characters are legible) of an image sensor to properly capture an image. Using the illustration above, even if a user has tangible paper that has many wrinkles (making the characters ineligible) or is too far away from an image sensor to make out the characters, particular embodiments will not still try to process the document and make extraction predictions but will only do so when the document is in view or the characters are legible enough, as indicated by particular VR overlays. Because these embodiments ensure that the image is properly captured, they make more accurate predictions relative to existing technologies.

In some embodiments, another technical solution or improvement is the intelligent presentation of indicators (e.g., a virtual reality (VR) overlay) to users to inform them that certain data sets (e.g., a number) belongs to a certain field (e.g., a total amount). For example, some embodiments superimpose specific colored pixel values over values (e.g., "$200.00"), which indicates that such value is a total amount. This leads to processing or other accuracy improvements, as the user is able to see which values are being associated with which keywords. Accordingly, human-computer interaction and accuracy are improved.

In some embodiments, another technical solution with respect to human-computer interaction and user interfaces, is the scanning or processing of documents in-video (or while an imaging device is activated or capturing image data) and/or the confirmation or auto-confirm that a value is indeed a constituent of a particular keyword. Such in-video process can be repeated with multiple documents (or multiple pages of a single document) to successively extract fields. For example, particular embodiments can automatically extract respective fields in response to detecting different documents depending on what an activated imaging device captures. In this way, particular embodiments scan multiple documents while staying in-video, one document at a time, thereby allowing the user to easily upload and have several documents processed in succession.

FIG. 1 is a block diagram of an illustrative system architecture 100 embodied within a user device 101 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system. The components of system 100 may be embodied as a set of compiled/interpreted computer instructions or functions, program modules, computer software services, microcode, firmware, logic that uses logic gates, and/or an arrangement of processes carried out on one or more computer systems.

The system 100 is generally directed to scoring and ranking natural language values (e.g., numbers or words) of a document to determine whether they are candidates to be constituents of certain keywords, according to some embodiments. The system 100 includes a user device 101, which include an OCR component 102, a keyword detector 104, a key-values rules component(s) 106, a location rules component 118, a natural language scorer 120, a natural language value ranker 122, and a presentation component 124.

The Optical Character Recognition (OCR) component 102 is generally responsible for detecting natural language characters (e.g., words and numbers) at a document and converting such characters into a machine-readable format (e.g., so that field extraction can occur). A "document" as described herein refers to digital image or other data object that contains one or more natural language characters, such as numbers, English words, or English phrases. In some instances a document represents or first exists as real world paper/document or other medium, which has been copied or scanned, via the OCR component 102, in order for the OCR component 102 to perform the rest of its functionality. In some embodiments, a document refers to entire object or set of pages that are associated with or belong to a particular event (e.g., a work duty job or series of tasks) or entity (e.g., a company). Each document, however, can have multiple pages. For example, invoice A (which has 5 ages) from Company B can be uploaded and invoice C (which has 10 pages) from company D can be uploaded. In this example, there are only two documents—invoice A and invoice C, even though both have multiple pages. In some embodiments, the OCR component 102 includes any suitable operating system OCR kit, such as APPLE's VisionKit, or GOOGLE's MLKit for use on ANDROID operating systems.

In some embodiments, a processor executing the OCR component 102 may first convert (e.g., via PymuPDF) one or more raw documents into another format in preparation for further processing by the OCR component 102. For example, the OCR component 102 may convert any document (e.g., a JPEG document) that is not an image into an image (e.g., a bitmap image of black and white pixel values, where the dark areas are identified as characters that need to be recognized and light areas are identified as background). Often, information is difficult to extract in certain formats (e.g., JPEG) and/or the original formats consume unnecessary computer memory resources. Accordingly, data may be converted from one format to another in order to extract all features of a document, save on memory resources, and the like all while maintaining high image quality. For example, the OCR component 102 can automatically convert a PDF document of several pages into an image file output format (e.g., .jpg, .png, .bmp, .tiff, etc.), such as via a PDF-to-JPG converter. JPEG, for example, is a file format that can contain image with 4:1 to 10:1 lossy image compression technique via conversion. With this compression technique embodiments can reduce the image size of images contained within PDF documents without losing the image quality.

In some embodiments, the OCR component 102 additionally or alternatively performs image quality functionality to change the appearance of the document by converting a color document to greyscale, performing desaturation (removing color), changing brightness, and changing contrast for contrast correctness, and the like. Responsively, the OCR component 102 can perform a computer process of rotating the document image to a uniform orientation, which is referred to as "deskewing" the image. From time to time, user-uploaded documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to the removing the background noise, some embodiments extract the characters from the document image and place the extracted characters in another format, such as JSON. Formats, such as JSON, can be used as input for other machine learning models, such as lightweight modified BERT models for language predictions, as described in more detail below.

In some embodiments, the OCR component 102 additionally (or alternatively) includes an object detection module to detect the document or objects in the document (e.g., via a machine learning model). For example, in some embodiments, in response to (or prior to) the OCR component 102 performing its functionality, text and object detection can be performed to convert 2D grayscale images to structured text associated with their bounding boxes and coordinates. For example, some embodiments use computer vision, object detection, and/or image classification techniques (e.g., Convolutional Neural Networks). In an illustrative example of object detection functionality, particular embodiments use one or more machine learning models (e.g., a Convolutional Neural Network (CNN)) to generate a bounding box that defines the boundaries and encompasses a computer object representing a feature (e.g., a total amount, a date, an address, etc.) of a document or the document itself. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents or the document itself. In an illustrative example, a first bounding box can be generated over an image of a document, which triggers image capture or OCR of a document. In another example, a second bounding box can be generated over a "total amount" indicia and labeled "amount", and a third bounding box can be generated over an object (e.g., a mountain image) and labeled "mountain," as indicated in a logo, for example.

In some embodiments, a processor executing the OCR component 102 detects or extracts each word and/or number of values in a document via any suitable functionality, such as via pattern recognition and/or feature detection. With respect to pattern recognition, the OCR component 102 is fed examples of natural language text in various fonts and formats, which are then used to compare, and recognize, characters in the scanned document. With respect to feature detection, the OCR component 102 applies rules regarding the features of a specific letter or number to recognize characters in the scanned document. Features could include the number of angled lines, crossed lines, curves, or the like in a character for comparison. For example, the capital letter "A" may be stored as two diagonal lines that meet with a horizontal line across the middle. In some embodiments, the output of the OCR component 102 is each extracted value of a document and an address (e.g., X and Y coordinates) of each extracted value in the document.

In some embodiments, the output of the OCR component 102 is each value for further downstream processing, as described in more detail below. Each value can be individual letters, numbers, words, symbols and/or a combination of numbers, words, and/or symbols depending on how the OCR component 102 parses characters. For example, two words, such as "Mulberry's Market," although two separate words may be combined or formatted as one single value since it refers to the same entity (e.g., a place of business as determined via NER or other NLP component). In this way, in some embodiments, the OCR component 102 can alternatively or additionally use NLP or other functionality to combine individual characters to formulate a value.

The keyword detector 104 is generally responsible for detecting one or more keywords, which represent keys in a key-value search to search for key-value pairs in the document, as described in more detail below. In some embodiments, the keyword detector 104 automatically (without user input) generates keywords for further processing (e.g., by the key-value rules component(s) 106, the natural language value scorer 120, the natural language value ranker 122, and/or the presentation component 124). For example, a list of keywords, such as "name," "address," "amount," "invoice number," or "date" may be stored to a data structure (e.g., a list) at application build time. Accordingly, at runtime (e.g., when a particular invoice needs to be processed), the keyword detector can access, in computer storage, the data structure and fetch each keyword in preparation to search for corresponding values within the document. Alternatively or additionally, in some embodiments, the keyword detector 104 detects keywords in response to receiving an indication of user input that specifies such keyword. For example, a user interface element may prompt a user to input the string she wishes to look for at a document, such as "total amount." Responsively, the keyword detector 104 generates such keyword and stores it in computer storage (e.g., RAM, cache, persistent storage, a database) in preparation for further processing, as described above.

In some embodiments, the keyword detector 104 takes, as input, the extracted or detected values (e.g., and their addresses/coordinates) produced via the OCR component 102, in order to search for one or more indications of the one or more keywords at the document. In some embodiments, an "indication" as described herein refers to the exact same syntax (e.g., letter-by-letter) as the keyword itself. For example, a processor executing the keyword detector 104 may take, as input, the word "amount" and find this exact phrase in the parsed document produced by the OCR component 102. Alternatively or additionally, in some embodiments, an "indication" refers to one or more words within the document with the same semantic meaning, but with differing syntax (e.g., different letters, and/or added/subtracted words) relative to the keyword. For example, a keyword may be "amount," but no such string with the exact match is found, but a similar phrase can be found in a document, such as "total."

In some embodiments, the keyword detector 104 searches for corresponding indications of keywords at the document via any suitable character matching algorithms and/or natural language processing. For example, in some embodiments, the keyword detector 104 uses term frequency-inverse document frequency (TF-IDF) algorithms. TF-IDF algorithms include numerical statistics that infer how important a query word or term is to a data set (e.g., a document). "Term frequency" illustrates how frequently a term of a query (e.g., a keyword) occurs within a data set, which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. In these embodiments, for example, where a keyword is "amount," these algorithms can use term frequency to find the exact string match (i.e., "amount") and remove all other words in the document via inverse document frequency.

In another example, the keyword detector 104 alternatively or additionally uses natural language processing (NLP) in order to find semantically similar words relative to the keyword(s). For instance, in some embodiments, the keyword detector 105 first tokenizes text on pages into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a page is tagged with identifiers, such POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a document against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, NLP includes Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. In this context of the present disclosure, for example, these tags or labels can indicate whether certain extracted attributes correspond to "total amount" of an item, the name of an entity (e.g., a particular corporation), line item information (e.g., description of service or item billed), address of an entity, or the particular date listed on the page The key-value rules component(s) 106 is generally responsible for performing a key-value search by determining whether each value of a document meets one or more rules or policy thresholds in light of one or more keywords and one or more indications of the keywords detected at the document via the keyword detector 104. From a build-time programming perspective, in some embodiments, the key-value rules component(s) 106 represents various conditional statements (e.g., if-then statements) or different objects in object-oriented programming. For example, the date component 108 may correspond to a first date object or class (or first set of conditional statements) and the amount component 110 may correspond to a second amount object or class (or second set of conditional statements). In some embodiments, the key-values rule component(s) 106 takes, as input, the indications of keyword(s) detected by the keyword detector 104, as well as the address of the indications and the rest of the values of the document, as detected via the OCR component 102.

The key-value rules component(s) 106 includes the date component 108, the amount component 110, the name component 112, the address component 114, and the font component 116. The date component 108 is generally responsible for determining whether each value within a document meets one or more criteria indicative of a value being a particular date (e.g., an invoice date, a receipt date, or "ship by date"). For example, for each value, the date component 108 may include a policy to increment a score by X if there is a forward slash symbol (/), increment the score by Y if there is a dash symbol (-), increment the score by T if there is a month indicator (e.g., "Mar." or "03"), and/or increment the score by Z if there is year indicator (e.g., "2022" or "22"). Likewise, there may be a policy to reduce (or not add to the score) when the values do not include these characteristics.

The amount component 110 is generally responsible for determining whether each value within a document meets one or more criteria indicative of a value being a total amount (e.g., the total cost in a receipt or invoice). For example, for each value, the amount component 110 may include a policy to increment a score by Z if there is a dollar sign symbol ($), increment the score by E if there a number, and increment the score by F if there is a decimal point (.), and/or increment the score by G if there is a currency code in the value (e.g., EUR for Europe). Likewise, there may be a policy to reduce (or not add to the score) when the values do not include these characteristics.

The name component 112 is generally responsible for determining whether each value within a document meets one or more criteria indicative of a value being the entity who is responsible for paying or receiving payment. For example, on a receipt, the name is the name of the entity (e.g., a grocery store) that the customer is paying or the entity for whom the customer has bought goods from. In an invoice, in some instances the name is the name of the entity that has provided goods or services to a customer and that is requesting payment from the customer via an invoice. For example, for each value, the name component 112 may include a policy to increment a score by Z if there is a threshold string (e.g., 2 or more) of natural language letters, increment the score by A if the value is close (within a threshold distance as determined via the distance component 118-2) of a detected business address, is at the top (e.g., is within a coordinate position threshold) of the document (as detected via the location component 118), and increment the score by T if there is a threshold quantity (e.g., more than 3 but less than 6), since entity names are likely to be short but descriptive enough.

The address component 114 is generally responsible for determining, for each value within a document, whether the value meets one or more criteria indicative of a value being a real-world shipping address that includes a unit number (e.g., house identifier), street identifier, City, State, and/or zip code. For example, for each value, the address component 114 may include a policy to increment a score by L if there are a threshold quantity of consecutive numbers (e.g., 2 or more, such as 13) to indicate a unit number, increment the score by P if there is a direction indicator (e.g., "North" or "N"), increment the score by Q if there is a natural language string immediately following the direction indicator, which indicates a street identifier, increment the score by R if there is an explicit street indicator (e.g., "Cir.", "street," "Dr.,") increment the score by S if there is a state or other geographic indicator (e.g., "MO" for Missouri or "AZ" for Arizona), and increment the score by T if there is a zip code indicator (e.g., as detecting whether there are 5 consecutive numbers to end the value).

The font component 116 is generally responsible for determining, for each value within a document, whether the value meets one or more criteria indicative of a value being a date, amount, name, address, or otherwise being a candidate for being a constituent of the keyword. For example, for each value, the font component 116 may include a policy to increment a score by M if the font size of the value is 12, increment the score by N, of the font type of the value is "Times New Roman," increment the score by P if the character type is a letter, number, and/or symbol, for example, and increment the score by R if the character is capitalized or lower case. These font characteristics may have utility for various reasons. For example, indications of keywords and their corresponding values may have identical font sizes and so the score may be incremented by a score of F to the degree the font of the value matches the detected indication of the keyword. In other instances, however, the indication of the keywords are noticeably larger than their corresponding values by a factor of P. For example, the string "total amount" may be capitalized and have a larger font size than its value, which indicates a key-value pair.

The location component 118 is generally responsible for determining, for each value within a document, whether the value meets one or more criteria indicative of the location of the value being within a particular location and/or distance threshold. In some embodiments, such location determination rules are for each value in isolation, such as the particular X, Y coordinates of the value, which may be indicative that it is a constituent of one or more keywords. For example, a number can be detected to be at a bottom footer of a document, which is indicative that the number is a page number based on the location alone. In other embodiments, such location determination rules may be in relation to the indications of the keywords or other document context (e.g., other values on the document). For example, if a value is within a threshold distance and/or alignment threshold relative to a particular indication of a keyword, then it is more indicative that the value is a constituent of the corresponding keyword.

The alignment component 118-1 is generally responsible for determining the degree to which each value is aligned to the indication of the key word at a document. For example, the alignment component 118-1 may determine whether each value is vertically aligned to the one or more indications of the one or more keywords or whether each value is horizontally aligned. Such alignment is indicative that a value is a constituent of a given keyword because in a lot of instances, such as in tables, values are located directly beneath or besides corresponding category names that indicate a keyword. For example, the keyword "total" is often directly above and in alignment with its corresponding total value (e.g., $100.00). Accordingly, any key-value pair that is not vertically aligned or horizontally aligned within a threshold (e.g., keyword is at upper-left page and value is at bottom-right page), is indicative that the value is not a constituent of the keyword.

In some embodiments, the alignment component 118-1 computes alignment based on an overlap function between the indication of the keyword and one or more values. In some embodiments, the overlap function returns a Boolean value (True or False; 0 or 1), which indicates whether two objects (e.g., a value and a keyword) have at least one point in common. The overlap function returns TRUE if the object in the first parameter overlaps or intersects the object in the second parameter and FALSE otherwise. In other embodiments, however, the overlap function returns a float or other continuous value to indicate the degree to which key and value overlap. Any suitable overlap functions may be utilized, such as Archimedean, general, 0-overlap, 1-overlap, n-dimensional, interval-valued, migrativity, distributivity, idempotency, and homogeneity of overlap functions.

The distance component 118-2 is generally responsible for computing a distance (e.g., Euclidian distance or Cosine distance) between an indication of a keyword and one or more values at a document. The closer, in distance, values are to indications of keywords, the more likely the values are to be constituents of the keyword. Likewise, the further away values are to indications of keywords, the less likely the values are to be constituents of the keyword.

The natural language value scorer 120 is generally responsible for, for a given keyword, scoring each value and aggregating multiple scores for each value of a document according to each of the components of the key-value rules component(s) 106. For example, for a given keyword, "TOTAL," and a value of "$500.00 USD," the date component 108 may compute a score of 0 (or some other low value), the amount component 110 may compute a first score of 5 based on the inclusion of a dollar amount symbol, a second score of 5 based on the decimal point, and a third score of 5 based on the currency indicator "USD" being present. The natural language value scorer 120 may then aggregate (e.g., add) these individual scores for a total score of 15. The name component 112 may compute a score of 0 (or a low score), the address component 114 may compute a score of 0 (or a low score). The font component 116 may compute a score of 5 based on the value and indication of the keyword being the same font. The natural language value scorer 120 may compute whether the alignment (as determined via the alignment component 118-1) is within one or more thresholds, such as computing that the indication of the keyword and the value is in vertical alignment, and the natural language value scorer 120 may responsively add 5 more points based on the alignment. The natural language value scorer 120 may then determine that the distance (as calculated via the distance component 118-2) between the indication of the keyword and value is within a distance threshold, and responsively add another 5 more points. The natural language scorer 120 may then add up all the score values (15+5+5+5) for the value "$500.00 USD" and keyword of "total" to arrive at a total score of 30. In some embodiments, this same process is repeated for each value (or a subset of values) and keyword within an entire document.

In some embodiments, for a given value and keyword, each of the scores for the date component 108, the amount component 110, the name component 112, and address component 114 are compared to compute cardinality—what category or keyword a value most likely belongs to. In order to compute this, in some embodiments it is determined which score is the highest in order to determine which values are initial candidates to be constituents of corresponding keywords. For example, using the illustration above, for the value "$500.00 USD," the highest score was 15, as computed via the amount component 110 (as opposed to the scores computed by the date component 108, the name component 112, the address component 114, and the font component 116). Therefore, it is determined that the most likely keyword pairing is "amount" as opposed to any other keyword.

The natural language value ranker 122 is generally responsible for ranking each scored value for a given keyword. The natural language value ranker 122 does this by comparing each aggregated (or cardinal categorical) score of each value for a given keyword and then ranking each value based on the score. In some embodiments, the higher the score, the higher the rank and the lower the score, the lower the rank. Using the illustrative example above, for the keyword "total," the highest scored value may be the value "$500.00 USD," with a score of 30, as opposed to other values on the same document, such as "20.00" (score of 20), or "12/22/2022" (score of 15). Accordingly, for example, the value "$500.00 USD" is ranked the highest.

The presentation component 124 is responsible for selecting and presenting at least one value based on the ranking via the natural language value ranker 122, where the selection is indicative that the at least one values is a candidate to be the constituent of the one or more keywords. For example, the presentation component 124 may only select and present the top or highest ranking value—"$500.00 USD—which means that it is the only candidate to be a constituent of the keyword "total." Alternatively, the presentation component 124 may select the top 2 (or N quantity) or highest ranking values indicating that both are candidates. In some embodiments, the presentation component 124 generates user interface features. Such features can include interface elements (such as VR overlays, graphics buttons, sliders, menus, audio prompts, alerts, alarms, vibrations, pop-up windows, notification-bar or status-bar items, in-app notifications, or other similar features for interfacing with a user), queries, and prompts.

Figure 2:
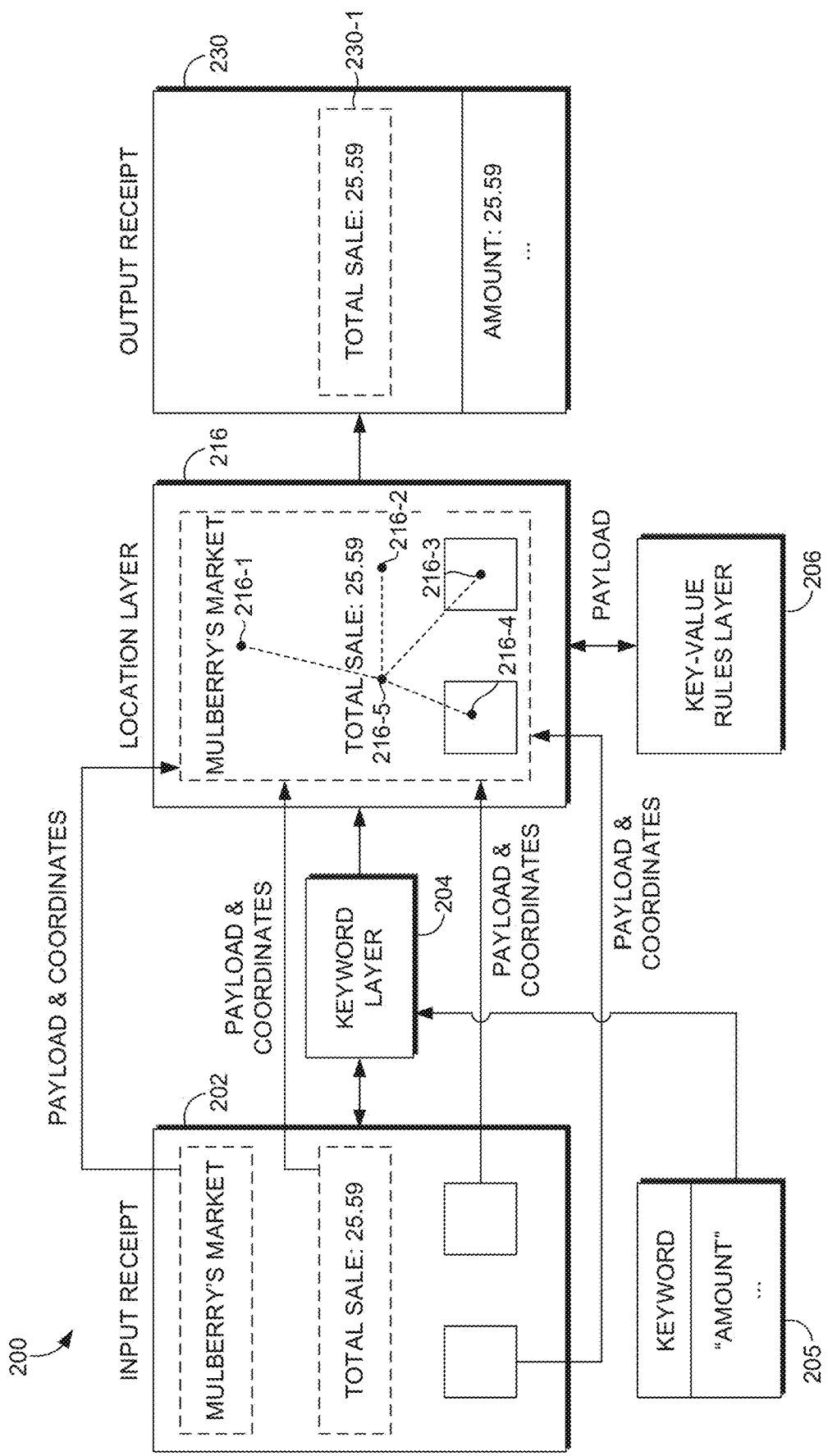
FIG. 2 is a schematic diagram of producing an output receipt given an input receipt, according to some embodiments.

FIG. 2 is a schematic diagram of producing an output receipt 230 given an input receipt 202, according to some embodiments. The input receipt 202 is a document that includes various values, such as "Mulberry's Market," "Total Sale," "$25.59," and the like. In some embodiments, the input receipt 202 is an image that has been processed via the OCR component 202 such that each of the values can be parsed, extracted, and analyzed, as illustrated in FIG. 2. For example, each value's payload and coordinates can be passed to the location layer 216 and/or key-value rules layer 206. In an illustrative example, the payload "Mulberry's Market" as well as its X, Y coordinates (4, 5) are extracted and passed to the location layer 217.

As illustrated in 205, the keyword is "amount." The keyword layer 204 takes the keyword "amount" 205 as input and searches for an indication of such keyword within the input receipt 202. In some embodiments, the keyword layer 204 includes the functionality as described with respect to the keyword detector 104 of FIG. 1. For example, the keyword layer 204 may first perform a TF-IDF search at the input receipt 202 in order to find an exact match of the keyword "amount" 205. Based on there being no exact match, the keyword layer 204 may then perform NLP-based functionality to find a semantically similar word or phrase relative to the keyword "amount" 205. Accordingly, the keyword layer 204 finds a semantically similar word—"total sale," which acts as an indication relative to the keyword "amount" 205.

The location layer 216 takes as input, the indication of the keyword—"total sale"—from the keyword layer 204, which is indicative that such character sequence is a reference point for distance or other location measures. The location layer 216 also takes as input, each of the payload values and coordinates from the input receipt 202. The location layer 216 then computes corresponding data points, as well as location and distance measures. The output is represented within 216—data points 216-1, 216-2, 216-3, 216-4, and 216-5 are all generated in a graph, and then distances and alignment values can then be calculated. In some embodiments, the location layer 216 includes the functionality as described with respect to the location component 118 of FIG. 1. For example, the most aligned key-value pairs or the closest distanced key-value pairs may be data points 216-5 and 216-2, which represent the values "total sale" and "$25.59" respectively.

The key-value rules layer 206 takes as input only the payload values themselves, such as "Mulberry's Market," "total sale," and "$25.59," and analyzes each sub-value of each value to determine whether each sub-value conforms to one or more rules or meets/falls outside of certain thresholds. For example, each of these values are analyzed determine if: they contain a dollar sign indicator ($) (if so increment the score), if they contain a decimal point indicator (if so increment the score), and if they contain numbers and not letters (if so increment the score). In some embodiments, the key-value rules layer 206 includes the functionality as described with respect to the key-value rules component(s) 106 of FIG. 1.

After values have been processed by the location layer 216, the key-value rules layer 206, and then scored and ranked (e.g., via the natural language scorer 120 and natural language ranker 122), particular embodiments produce the output receipt 230. In some embodiments, as illustrated in FIG. 2, the output receipt 230 includes all of the data or information as contained in the input receipt 202, except that the output receipt 230 contains additional data or information, such as explicitly listed key value pairs—"amount: $25.29"—and the pixel values 230-1, which have been superimposed over both the indication of the keyword and the corresponding value. Such pixel values 230-1 indicate that for the keyword "amount," the value of "$25.59" is a candidate to be a constituent of the indication of the keyword—"total sale."

Figure 3:
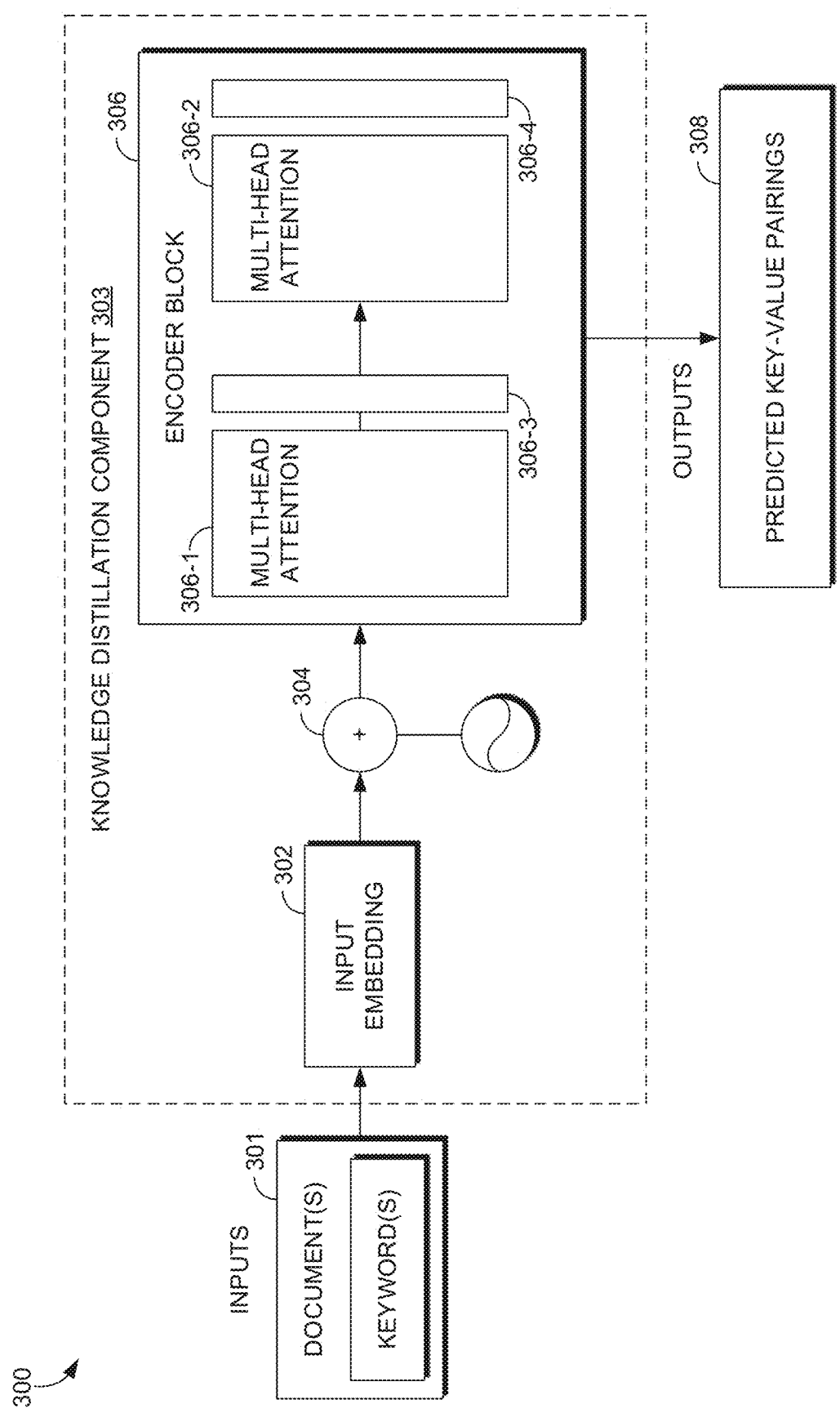
FIG. 3 is a block diagram of a modified BERT model or encoder that uses particular inputs to predict key-value pairings, according to some embodiments.

FIG. 3 is a block diagram of a modified BERT model or encoder that uses particular inputs to predict key-value pairings, according to some embodiments. In some embodiments, this model alternatively (or additionally) represents the natural language value scorer 120 and/or the key-value rules component(s) 106 of FIG. 1. Accordingly, the modified model may, for example, be stored to the user device 101 of FIG. 1. FIG. 3 includes the inputs 301, which are fed into the knowledge distillation component 303, which includes the input embedding 302, and the encoder block 306, which is used to produce the outputs 308, which is the predicted key-value pairings.

The knowledge distillation component 303 is generally responsible for using compression techniques to compress a first version of a machine learning model into a smaller second version of the machine learning model. In this way, the model can be stored to a user device and a pre-training component can learn natural language and context based on a smaller dataset and thus a lighter model, relative to full models. For example, knowledge distillation can be performed during pre-training in order to reduce the size of an existing BERT model by 40%, while retaining 97% of its language understanding capabilities and being 60% faster than BERT. In other words, it is possible to reach similar performances on particular downstream tasks using much smaller language models pre-trained with knowledge distillation, resulting in models that are lighter and faster at inference or prediction time, while also requiring a smaller computational training budget. Such compression techniques can be, for example, knowledge distillation. Knowledge distillation is a compression technique in which a compact model—the student—is trained to reproduce the behavior of a larger model—the teacher—or an ensemble of models. In supervised learning, a classification model is generally trained to predict an instance class by maximizing the estimated probability of gold labels. A standard training objective thus involves minimizing the cross-entropy between the model's predicted distribution and the one-hot empirical distribution of training labels. A model performing well on the training set will predict an output distribution with high probability on the correct class and with near-zero probabilities on other classes. But some of these "near-zero" probabilities are larger than others and reflect, in part, the generalization capabilities of the model and how well it will perform on the test set.

In some embodiments to compute training loss, the student is trained with a distillation loss over the soft target probabilities of the teacher:

$$L_{ce} = \Sigma_i t_i * \log(s_i)$$

where $t_i$ (resp. $s_i$) is a probability estimated by the teacher (resp. the student). This objective results in a rich training signal by leveraging the full teacher distribution. In some embodiments, a softmax-temperature is used:

$$p_i = \frac{\exp(z_i/T)}{\sum_j \exp(z_j/T)}$$

where T controls the smoothness of the output distribution and $z_i$ is the model score for the class i. The same temperature T is applied to the student and the teacher at training time, while at inference, T is set to 1 to recover a standard softmax. The final training objective is a linear combination of the distillation loss $L_{ce}$ with the supervised training loss, which can be the masked language modeling loss $L_{mlm}$. Some embodiments add a cosine embedding loss ($L_{cos}$), which will tend to align the directions of the student and teacher hidden states vectors.

After the model(s) have been compressed via the knowledge distillation component 303, the inputs 301 are converted into feature vectors and embedded into an input embedding 302 to derive meaning of an individual word (for example, English semantics). In some embodiments, the documents of the inputs 301 include, for example, multiple invoices and/or receipts, such as the receipt 202, as illustrated in FIG. 2. Alternatively or additionally, the documents include other documents to understand English language, such as text books, periodicals, blogs, social media feeds, and the like.

In some embodiments, each word or character in the input(s) 301 is mapped into the input embedding 302 in parallel or at the same time, unlike existing LSTM models, for example. The input embedding 302 maps a word to a feature vector representing the word. But the same word (for example, "apple") in different sentences may have different meanings (for example, phone v. fruit). This is why a positional encoder 304 can be implemented. A positional encoder is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin(pos/10000^{2i/d_{model}})$$

$$PE_{(pos,2i+1)} = \cos(pos/10000^{2i/d_{model}})$$

After passing the input(s) 301 through the input embedding 302 and applying the positional encoder 304, the output is a word embedding feature vector, which encodes positional information or context based on the positional encoder 304. These word embedding feature vectors are then passed to the encoder block 306, where it goes through a multi-head attention layer 306-1 and a feedforward layer 306-2. The multi-head attention layer 306-1 is generally responsible for focusing or processing certain parts of the feature vectors representing specific portions of the input(s) 301 by generating attention vectors. For example, in Question Answering systems, the multi-head attention layer 306-1 determines how relevant the $i^{th}$ word (or particular word in a block) is for answering the question or relevant to other words in the same or other blocks, the output of which is an attention vector. For every word, some embodiments generate an attention vector, which captures contextual relationships between other words in the same sentence, block, and or line. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \text{softmax}\left(\frac{Q \cdot K^T}{\sqrt{\text{Dimension of vector } Q, K \text{ or } V}}\right) \cdot V$$

For multi-headed attention, there a multiple weight matrices $W^q$, $W^k$ and $W^v$ so there are multiple attention vectors Z for every word. However, a neural network may only expect one attention vector per word. Accordingly, another weighted matrix, $W^z$, is used to make sure the output is still an attention vector per word. In some embodiments, after the layers 306-1 and 306-2, there is some form of normalization (for example, batch normalization and/or layer normalization) performed to smoothen out the loss surface making it easier to optimize while using larger learning rates.

Layers 306-3 and 306-4 represent residual connection and/or normalization layers where normalization re-centers and re-scales or normalizes the data across the feature dimensions. The feed forward layer 306-2 is a feed forward neural network that is applied to every one of the attention vectors outputted by the multi-head attention layer 306-1. The feed forward layer 306-2 transforms the attention vectors into a form that can be processed by the next encoder block or making a prediction at 308. For example, given that a user has currently (or historically) typed a first natural language sequence "the due date is . . . " the encoder block 306 can predict that the next natural language sequence (or field type) will be a specific date or be particular words based on past documents that include language identical or similar to the first natural language sequence.

In some embodiments, the encoder block 306 includes pre-training and fine-tuning to learn language (pre-training) and make the predictions at 308 (fine-tuning). In some embodiments, pre-training is performed to understand natural language and fine-tuning is performed to learn a specific task, such as learning an answer to a set of questions (in QA systems), such as learning which keywords are paired with particular values (i.e., learning which values are constituents of specific keywords).

In some embodiments, the encoder block 306 learns what language and context for a word is in pre-training by training on two unsupervised tasks—MLM and NSP—simultaneously or at the same time. In terms of the inputs and outputs, at pre-training, the only input of 301 may be various historical documents, such as text books, journals, periodicals (and not user information) in order to output the predicted natural language characters (not predicted key-value pairs at this point). The encoder block 306 takes in a sentence, paragraph, or line (for example, included in the input(s) 301), with random words being replaced with masks. The goal is to output the value or meaning of the masked tokens. For example, if a line reads, "please [MASK] this document promptly," the prediction for the "mask" value is "send." This helps the encoder block 306 understand the bidirectional context in a sentence, paragraph, or line at a document. In the case of NSP, the encoder 306 takes, as input, two or more elements, such as sentences, lines, or paragraphs and determines, for example, if a second line in a document actually follows (for example, is directly below) a first line in the document. This helps the encoder block 306 understand the context across all the elements of a document, not just within a single element. Using both of these together, the encoder block 406 derives a good understanding of natural language.

In some embodiments, during pre-training, the input to the encoder block 306 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 302). At the output side is the binary output for the next sentence prediction. For example, this component may output 1, for example, if masked line 2 followed (for example, was directly beneath) masked block 1. The output is word feature vectors that correspond to the outputs for the machine learning model functionality. Thus, the number of word feature vectors that are input is the same number of word feature vectors that are output.

In some embodiments, the initial embedding (for example, the input embedding 302) is constructed from three vectors—the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 301) that is encoded into a vector (for example, first sentence, second sentence, etc. assuming a top-down and right-to-left approach). The position embeddings are vectors that represent the position of a particular word in such sentence that can be produced by 304. When these three embeddings are added or concatenated together, an embedding vector is generated that is used as input into the encoder block 306. The segment and position embeddings are used for temporal ordering since all of the vectors are fed into the encoder block 306 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

Some embodiments are additionally responsible for fine-tuning the encoder block 306 after it has been pre-trained. In terms of the inputs and output, the input(s) 301 may now include each value multiple receipts and/or invoices and keywords. Once pre-training is performed, the encoder block 306 can be trained on very specific tasks, such as Question Answering, modified NSP or MLM, determining key-value pairs, and the like. In QA tasks, models receive a question regarding text content (for example, "given the value X, what is its keyword?") For example, in Question Answering, some embodiments replace the fully connected output layers of the encoder block 306 using in pre-training, with a fresh set of output layers that can output the answer to a given question. Subsequently, supervised training can be performed using a Question Answering dataset.

Accordingly certain embodiments can change the model for fine-tuning by changing the input layer and the output layer. That is, for example, the inputs are changed from the masked sentence 1 and 2 tokens to a "question" and "sentence" that contains an answer (or candidate answer) as the tokens. In the output layer, certain embodiments output the start and end words (or characters) that encapsulates the answer. In some embodiments, such question-answer pairs are specifically labeled as completed or not completed (for example, answered or not answered).

In an illustrative example of fine-tuning or making inferences with the encoder block 306, some embodiments learn that given keyword Y, the most likely value is T (i.e., a predicted key-value pair in 308). In this way, a language model can be trained and fine-tuned not only to understand natural language but predict which particular values are constituents of particular keywords. In some embodiments, such predictions are based on fine-tuning models by, for example, labeling each value of each document with corresponding keywords and/or labeling each indication of keywords so that location information can be derived (e.g., as used by the location component and alignment component of FIG. 1) and/or other attributes. In some embodiments, such predictions can be in near real-time relative to the time at which users input particular characters at document based on processing the input through the language model.

Figure 4A:
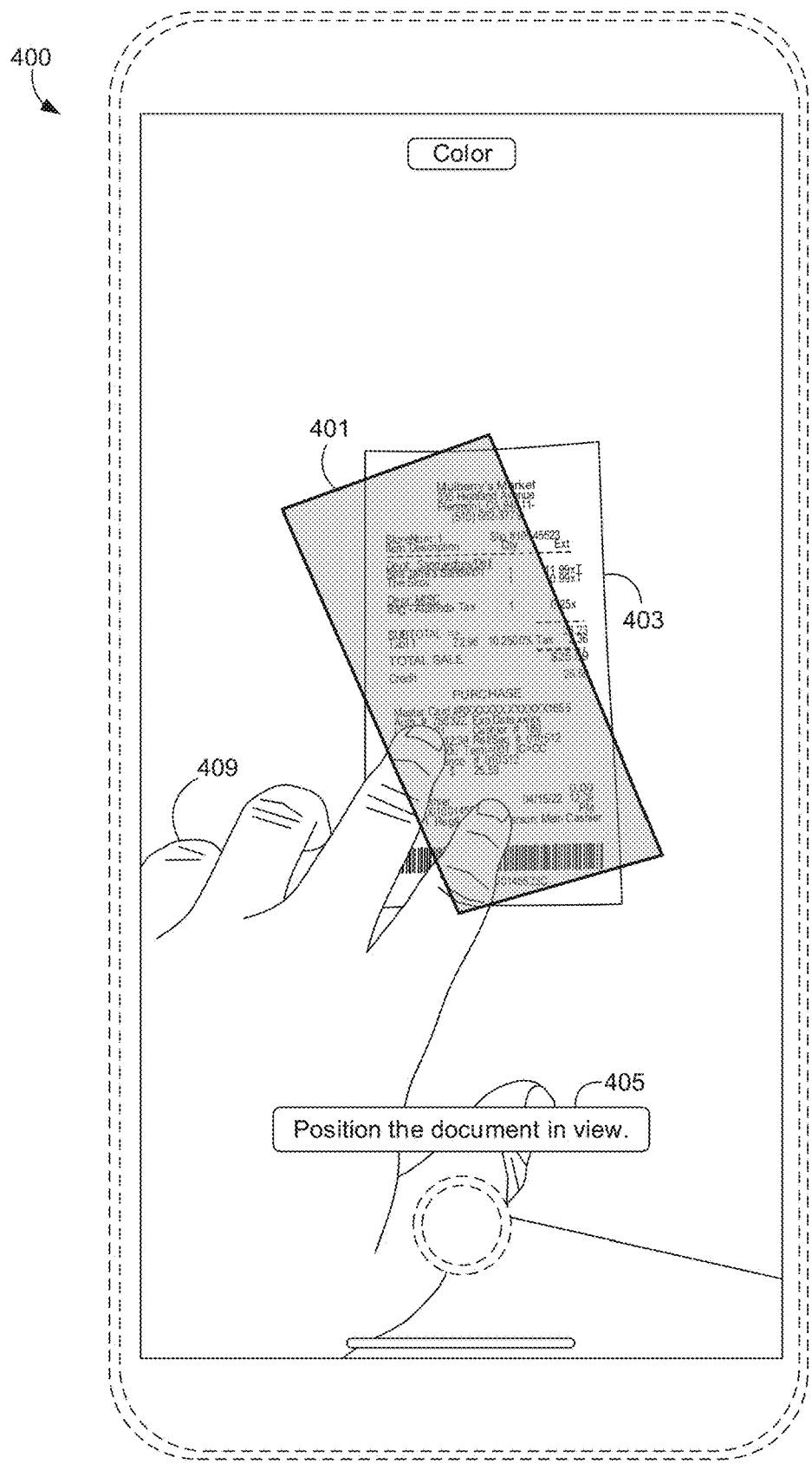
FIG. 4A is a screenshot of an example user interface to assist a user for correctly positioning a receipt in preparation for further processing, according to some embodiments.

FIG. 4A is a screenshot 400 of an example user interface to assist a user for correctly positioning a receipt 403 in preparation for further processing, according to some embodiments. In some embodiments, the screenshot 400 represents functionality performed by the presentation component 124 of FIG. 1. The receipt 403 is one example of a "document" as described herein. In some embodiments, the receipt 403 represents the input receipt 202, prior to having been parsed or processed via OCR.

An image sensor (e.g., a camera) located at a user device (e.g., a mobile phone) captures the screenshot 400, which is part of a video sequence of frames. Prior to the capture of the screenshot 400, such image sensor has been activated by the user. For example, in some embodiments, a user may have opened a particular application locally stored to the user device. In response to receiving an indication that the user has selected a button or other user interface feature at the application, particular embodiments activate video recording functionality for which the screenshot 400 is one video frame of multiple video frames. The screenshot 400 is thus an image of a real world receipt 403 and user 427, with additional user screen data, such as the VR overlay 401 and the indicator 405.

In response to the image sensor being activated, particular embodiments present the indicator 405 to prompt the user 427 to position the receipt 403 "in view" (e.g., within a distance threshold away from the image sensor, or within a particular orientation threshold). Accordingly, the user, for example, rotates the document 403 until it is in view. The VR overlay 401 (e.g., a uniform set of colored pixel values) is configured to be superimposed over the entirety of the receipt 403 regardless of size or real-time in-video positioning of the receipt 403. The VR overlay 401 assists the user in determining whether the receipt 403 is in view. Accordingly, for example, in response to receiving an indication that the receipt 403 is being moved in-video, as is illustrated in FIG. 4A, the VR overlay 401 follows and conforms to the receipt 403's edges until the VR overlay 401 conforms to the boundaries of the receipt 403 and covers the entirety of the receipt 403 (i.e., it is in view), as is illustrated in FIG. 4B.

In some embodiments, such following and conforming of the VR overlay 401 to the receipt 403 occurs via any suitable computer vision or image processing techniques. For example, some embodiments utilize object detection of the receipt 403, where the VR overlay 401 acts as a bounding box. In another example, some embodiments map one or more homographies between the receipt 403 and the VR overlay 401. A "homography" refers to a transformation data element or structure (e.g., a 3×3 matrix) that maps points in one image (the receipt 403) to corresponding points in another image (the VR overlay 401). For example, a first set of pixels representing a first edge of the receipt 403 can be mapped to a second set of pixels representing the same first edge of the VR overlay 401. In this way, pixels in different images representing the same object can be identified.

Figure 4B:
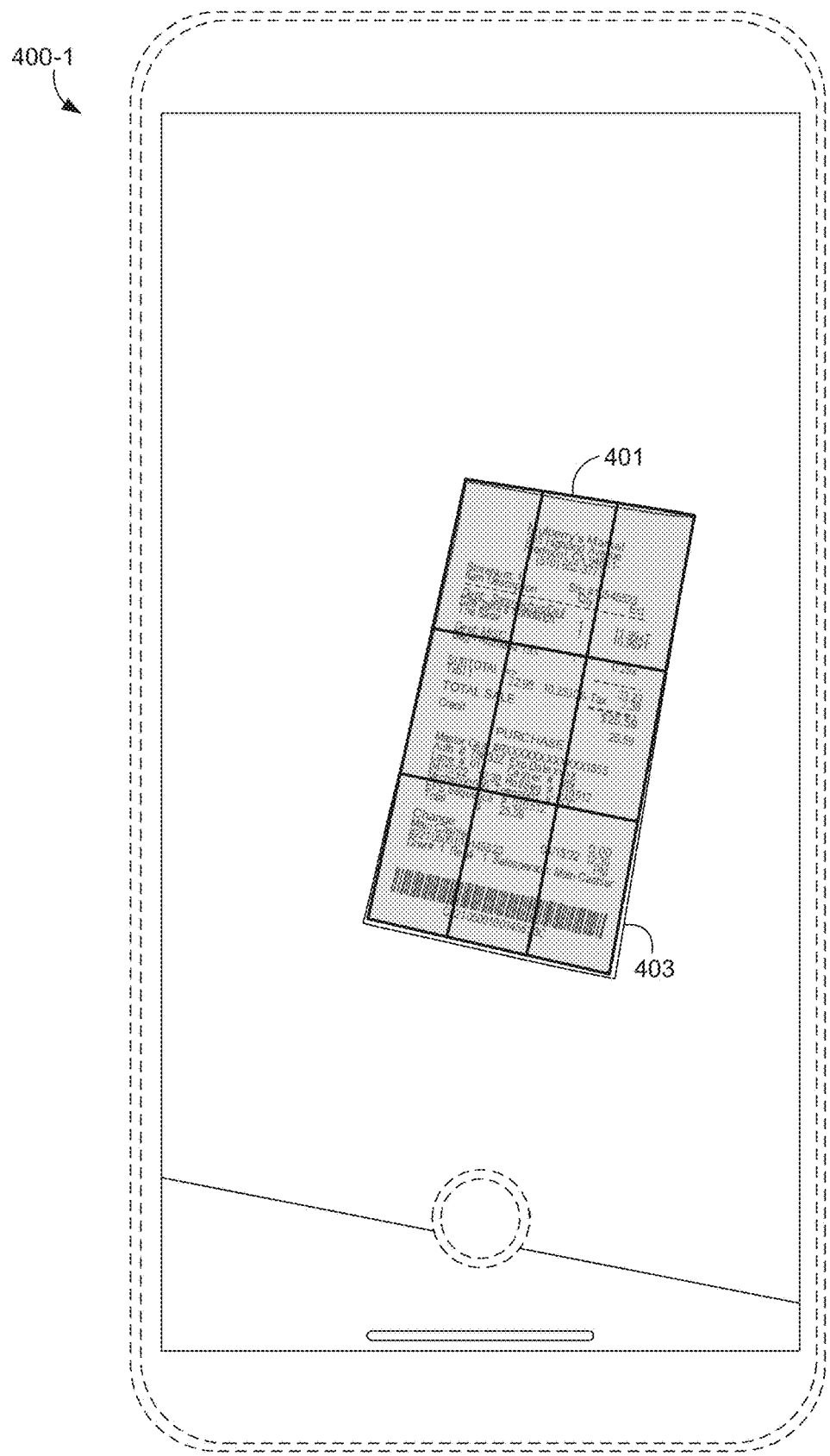
FIG. 4B is a screenshot illustrating that the receipt of FIG. 4A is now in view, according to some embodiments.

FIG. 4B is a screenshot 400-1 illustrating that the receipt 403 of FIG. 4A is now in view, according to some embodiments. As illustrated in FIG. 4B, the VR overlay 401 is in alignment with the receipt 402 and the VR overlay 401 includes additional vertical and horizontal lines relative to the VR overlay 401 of FIG. 4A. Such alignment and the presentation of the additional vertical and horizontal lines indicates that the receipt 403 is in view and ready for a snapshot or still image capture, as illustrated in FIG. 4C.

Figure 4C:
FIG. 4C is a screenshot illustrating that a snapshot of the receipt of FIG. 4A has been taken, according to some embodiments.

FIG. 4C is a screenshot 400-3 illustrating that a snapshot 406 (also considered a "document") of the receipt 403 of FIG.4A has been taken, according to some embodiments. In some embodiments, such snapshot (e.g., a still image) 406 occurs automatically. In other embodiments, the snapshot 406 is taken in response to receiving an indication of a user request to take such snapshot 406. In an illustrative example of automated embodiments, in response to detecting that the receipt 403 is in view and presenting the vertical and horizontal lines as illustrated in FIG. 4B, particular embodiments automatically take a snapshot 406 of the receipt 403. In an illustrative example of user request embodiments, in response to receiving an indication that the user has selected the button 432 (e.g., a shutter button), particular embodiments capture a snapshot 406 of the receipt 403, as illustrated in FIG. 4C. As illustrated in FIG. 4C, the snapshot 406 of the receipt 403 contains multiple values, such as "Mulberry's Market," "TOTAL SALE," "11.99," and the like.

In response to receiving an indication that the snapshot 406 of the receipt 403 has been taken as illustrated in FIG. 4C, particular embodiments perform the processing as described with respect to FIG. 1, FIG. 2, and/or FIG. 3. For example, in response to receiving an indication that the 406 snapshot of the receipt 403 has been taken, the OCR component 102 automatically extracts and parses all of the values within the snapshot 406, the keyword detector 104 automatically performs its functionality, the key-values rules component(s) 106 automatically performs its functionality, the location component 118 automatically performs its functionality, the natural language value scorer 120 automatically performs its functionality, and the natural language ranker automatically 122 performs its functionality to determine which values are candidates for being constituents for one or more keywords, as described with respect to FIG. 1.

As described herein, some embodiments scan (or take a snapshot of) documents in-video (or while an imaging device is activated or capturing data recording images), as illustrated in FIG. 4C. Such in-video process can be repeated with multiple documents to successively extract fields. For example, particular embodiments can automatically extract respective fields in response to detecting different documents depending on what an activated imaging device captures. In this way, particular embodiments scan multiple documents while staying in-video, one document at a time, thereby allowing the user to easily upload and have several documents processed in succession.

Figure 4D:
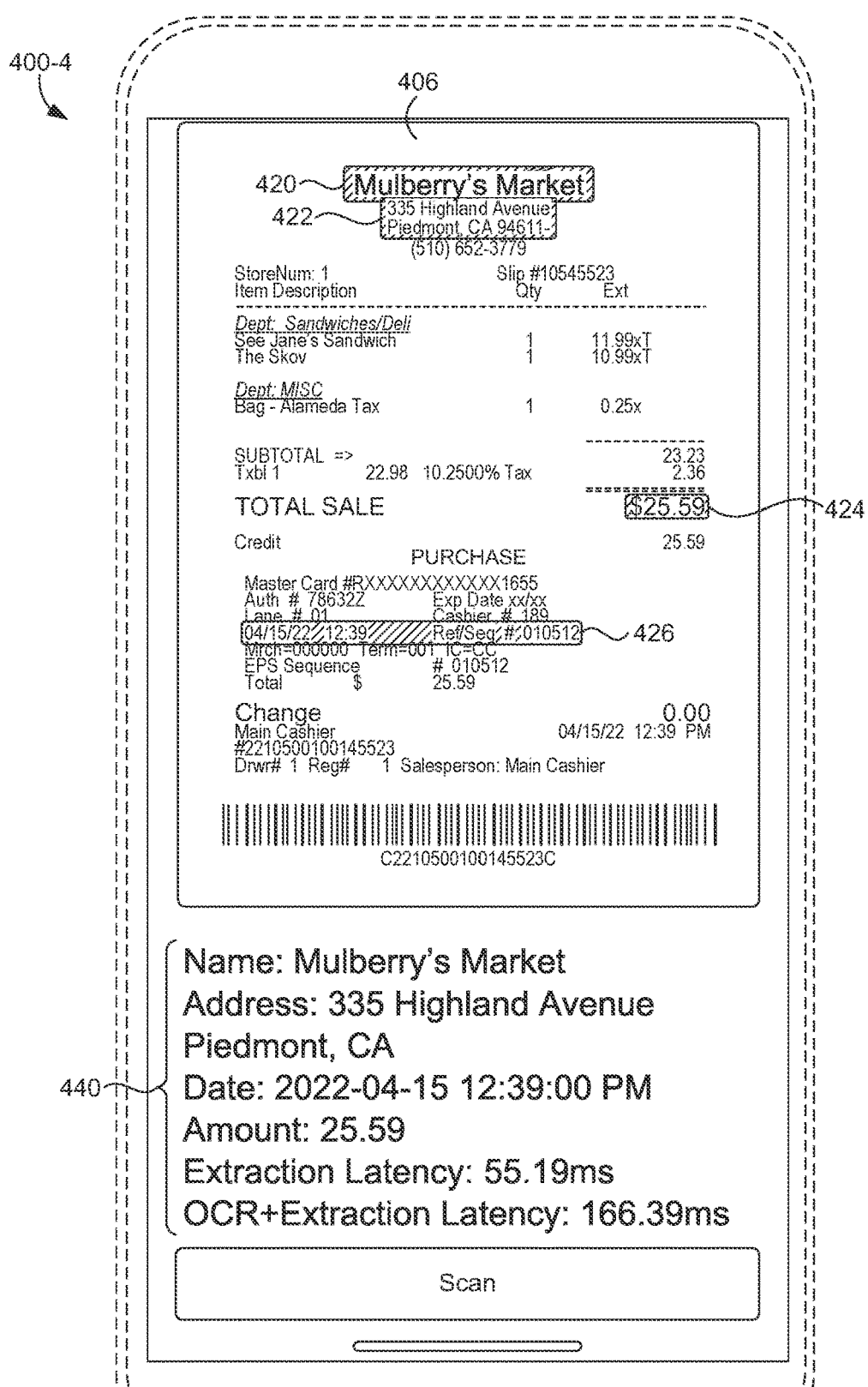
FIG. 4D is a screenshot illustrating the different key-value pairs that have been located at the receipt of FIG. 1, according to some embodiments.

FIG. 4D is a screenshot 400-4 illustrating the different key-value pairs that have been located at the receipt 403 of FIG. 1, according to some embodiments. In some embodiments, the snapshot 406 in FIG. 4D represents the output receipt 230 of FIG. 2. The screenshot 400-4 represents the output that is produced by the components of FIG. 1, FIG. 2, and/or FIG. 3. For example, as described above, after the snapshot 406 of the receipt 403 has been captures as illustrated in FIG. 4C, and in response to the natural language ranker 122 automatically performing its functionality to determine which values are candidates for being constituents for one or more keywords, the presentation component 124 may then present the screenshot 400-4.

As illustrated in FIG. 4D, the screenshot 400-4 lists various key-value pairs 440. The keywords are as follows: "name," "address," "date," and "amount." The respective values are as follows: "Mulberry's Market," "335 Highland Avenue Piedmont, CA," "2022-04-15 12:39:00 pm," and "$25.59." Each key-value pair indicate that the respective value is a candidate for being a constituents of the corresponding keyword. For example, the value "Mulberry's Market," is a candidate for being a constituent of the "name" keyword. Such key-value pairs 440 and/or the VR overlays 420, 422, 424, and 426 improve the user experience because the user does not have to scan the entire receipt 403 to find certain values, but can simply look at the key-value pairings or VR overlays for the most useful information, which may also be helpful when there are multiple pages of receipts or invoices. After such field extraction and production of the screenshot 400-4, some embodiments perform additional automatic processing, such as automatically adding up "amount" values for each receipt snapshot taken in-video, or automatically formatting each key-value pair of each document into a single document or format, or automatically exporting the key-value pairings to a file, or the like.

FIG. 4D further illustrates various VR overlays 420, 422, 424, and 426, which highlights, at the snapshot 406, each value that has been selected as a candidate for being a constituent to a particular keyword. For example, the VR overlay 420 (e.g., a first color of pixels) is super imposed over the "Mulberry's Market" value, which indicates that "Mulberry's Market" is a value that belongs to or is otherwise a constituent of a particular keyword. In some embodiments, each VR overlay 420, 422, 424, or 426 is color-coded such that each overlay is a unique color that corresponds to a unique keyword. For example, the word "name" in the key-value pairs 440 may be set to an RGB pixel intensity value of purple and the VR overlay 420 may likewise be set to an RGB pixel intensity value of purple to indicate that the "Mulberry's Market" value is a constituent of the "name" keyword. Similarly, the word "address" in the key-value pairs 440 may be set to an RBG pixel intensity value of green and the VR overlay 422 may be likewise be set to an RGB pixel intensity value of green to indicate that the "335 Highland Ave . . . " value is a constituent of the "address" keyword.

In some embodiments, the screenshot 400-4 includes a selectable confirmation or auto-confirm button (now shown) to receive confirmation from users that a value is indeed a constituent of a particular keyword. This increases the accuracy, as embodiments may incorrectly pair keywords and value sand users can indicate the inaccuracy and change such pairings in response to receiving an indication that the pairing is incorrect.

Figure 5A:
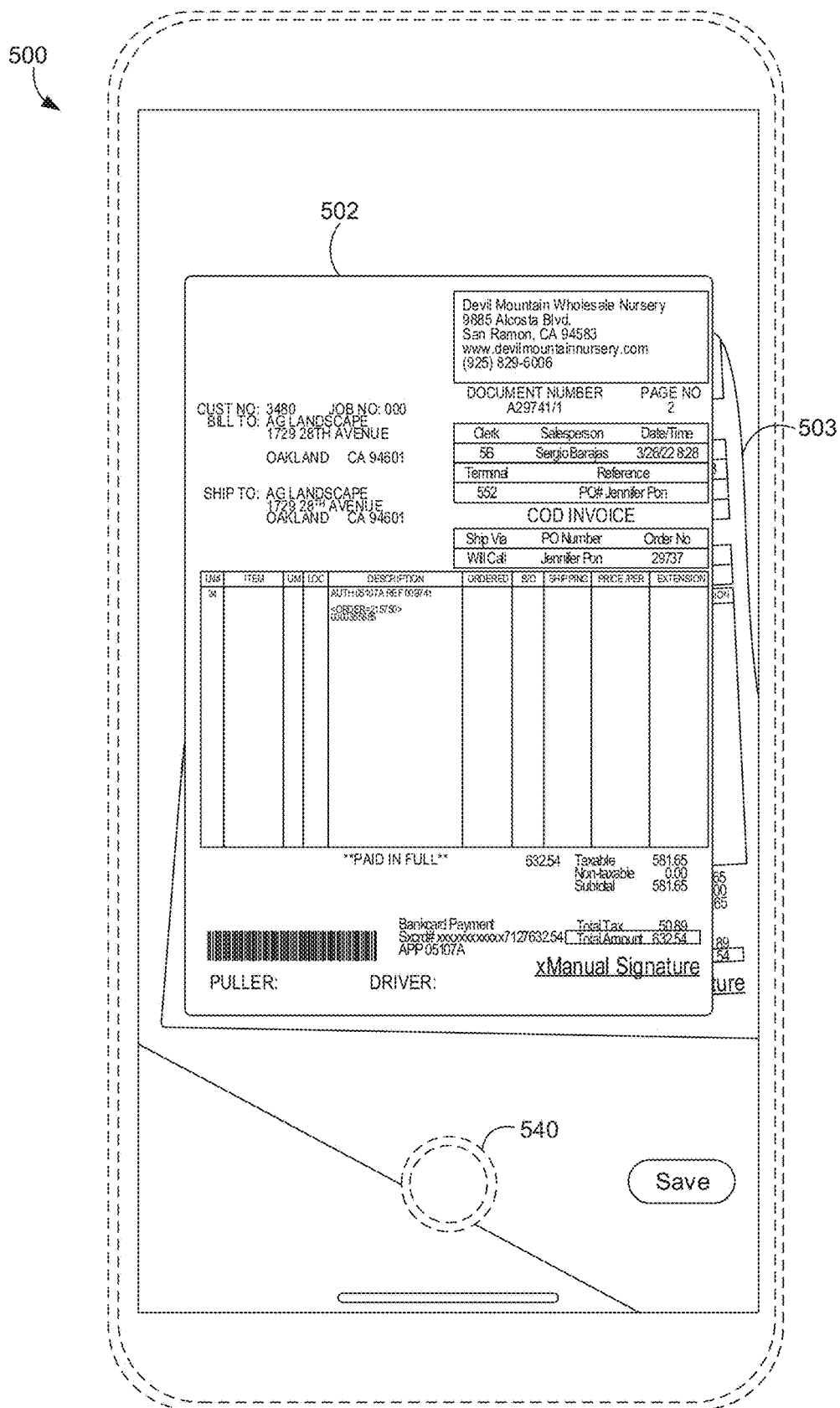
FIG. 5A is a screenshot illustrating that a snapshot of the invoice 503 has been taken, according to some embodiments.

FIG. 5A is a screenshot 500 illustrating that a snapshot 502 of the invoice 503 has been taken, according to some embodiments. In some embodiments, the screenshot 500 represents functionality performed by the presentation component 124 of FIG. 1. The invoice 503 or the snapshot 502 is one example of a "document" as described herein. In some embodiments, the invoice 503 or the snapshot 502 represents the input receipt 202, prior to having been parsed or processed via OCR.

In some embodiments, such snapshot (e.g., a still image) 502 occurs automatically. In other embodiments, the snapshot 502 is taken in response to receiving an indication of a user request to take such snapshot, such as a selection of the button 540. In some embodiments, functionality identical to FIGS. 4A through 4B occurs prior to the producing of the screenshot 500. For example, after an image sensor has been activated to capture or record video segments, some embodiments prompt the user to place the invoice 503 in view via VR overlays and in response to the invoice 503 being in view and the generation of the horizontal and vertical lines at the invoice 503, particular embodiments capture the snapshot 502.

In response to receiving an indication that the snapshot 502 of the invoice 503 has been taken as illustrated in FIG. 5A, particular embodiments perform the processing as described with respect to FIG. 1, FIG. 2, and/or FIG. 3. For example, in response to receiving an indication that the snapshot 502 of the invoice 503 has been taken, the OCR component 102 automatically extracts and parses all of the values within the invoice snapshot 502, the keyword detector 104 automatically performs its functionality, the key-values rules component(s) 106 automatically performs its functionality, the location component 118 automatically performs its functionality, the natural language value scorer 120 automatically performs its functionality, and the natural language ranker automatically 122 performs its functionality to determine which values are candidates for being constituents for one or more keywords, as described with respect to FIG. 1.

Figure 5B:
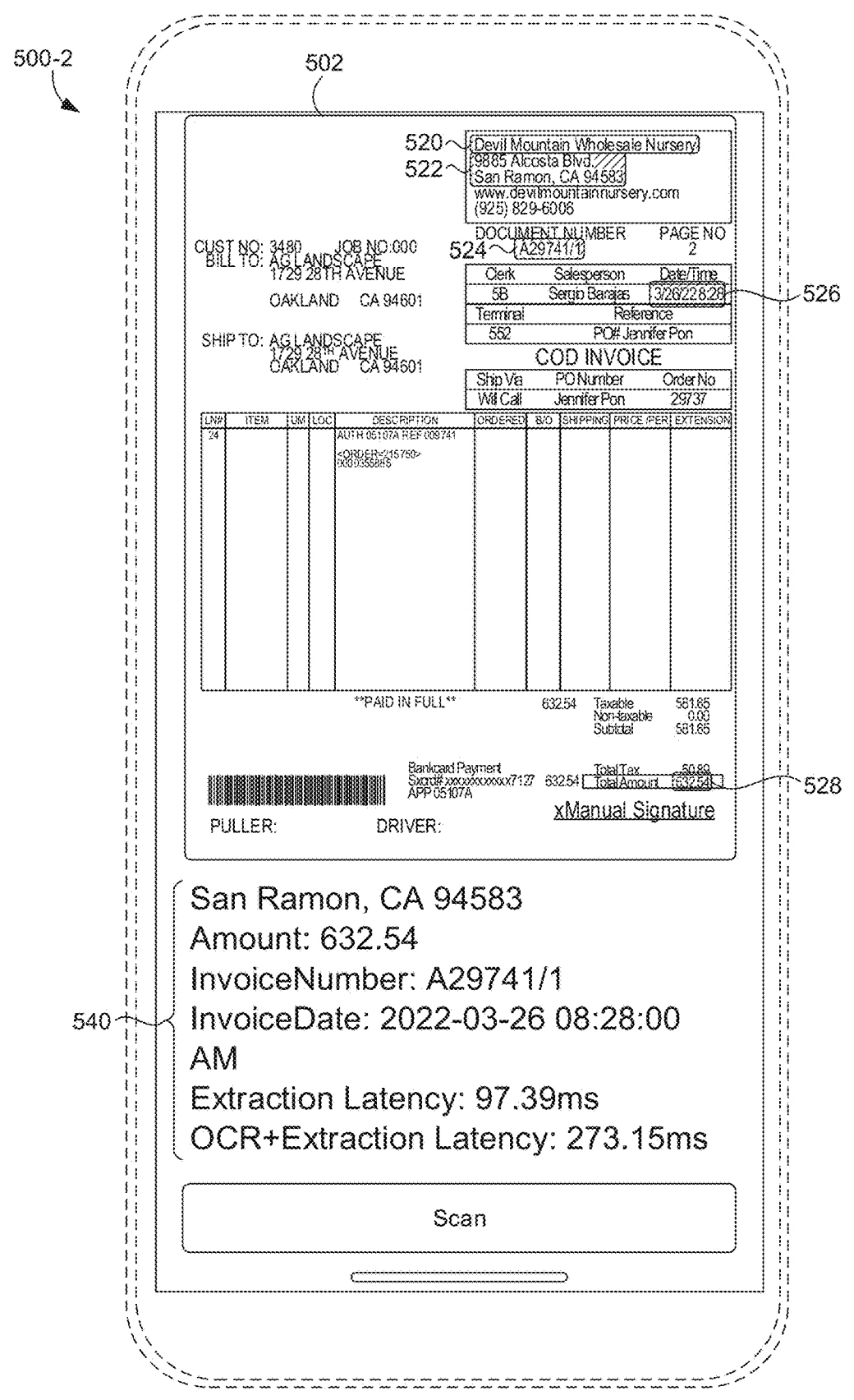

FIG. 5B is a screenshot 500-2 illustrating the different key-value pairs that have been located at the snapshot 502 of FIG. 5A, according to some embodiments. In some embodiments, the snapshot 502 in FIG. 5B represents the output receipt 230 of FIG. 2. In some embodiments, the screenshot 500-2 represents the output that is produced by the components of FIG. 1, FIG. 2, and/or FIG. 3. For example, as described above, after the snapshot 502 of the invoice 503 has been captured as illustrated in FIG. 5A, and in response to the natural language ranker 122 automatically performing its functionality to determine which values are candidates for being constituents for one or more keywords, the presentation component 124 may then present the screenshot 500-2.

As illustrated in FIG. 5B, the screenshot 500-2 lists various key-value pairs 540. The keywords are as follows: "name," "address," "invoice number," and "invoice date." The respective values are as follows: "Devil Mountain Wholesale Nursery," "9885 Acosta Blvd. San Ramon, CA 94583," "$632.54," "A29741/1," and "2022-03-06 08:28:00 am." Each key-value pair indicate that the respective value is a candidate for being a constituents of the corresponding keyword. For example, the value "Devil Mountain Wholesale Nursery" is a candidate for being a constituent of the "name" keyword.

FIG. 5B further illustrates various VR overlays 520, 522, 524, 526, and 528, which highlights, at the snapshot 502, each value that has been selected as a candidate for being a constituent to a particular keyword. For example, the VR overlay 520 (e.g., a first color of pixels) is superimposed over the "Devil Mountain Wholesale Nursery" value, which indicates that it is a value that belongs to or is otherwise a constituent of a particular keyword. In some embodiments, each VR overlay is color-coded such that each overlay is a unique color that corresponds to a unique keyword, as described above with respect to FIG. 4D.

Figure 6:
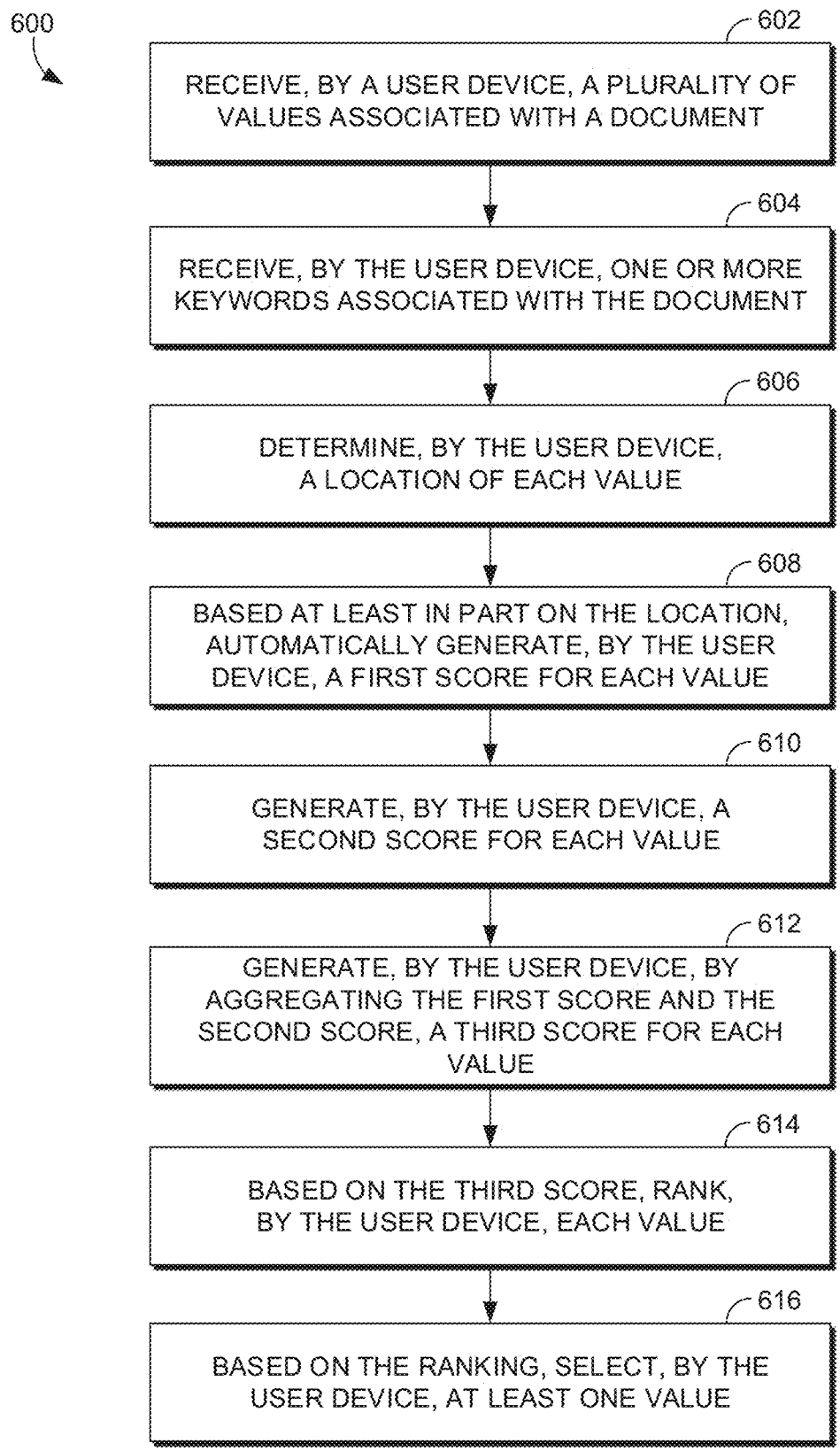
FIG. 6 is a flow diagram of an example process for determining that at least one value is a constituent of a keyword, according to some embodiments.

FIG. 6 is a flow diagram of an example process 600 for determining that at least one value is a constituent of a keyword, according to some embodiments. The process 600 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. SB). The computer-implemented method, the system (that includes at least one computing device having at least one processor and at least one computer readable storage medium), and/or the computer readable medium as described herein may perform or be caused to perform the process 600 or any other functionality described herein.

Per block 602, a user device (e.g., a mobile phone) receives a plurality of values associated with a document (e.g., a snapshot of a real-world paper document). In some embodiments, each value, of the plurality of values, have been parsed from the document via optical character recognition (OCR). In some embodiments, the plurality of values include one or more natural language (e.g., English) words and one or more numerical characters (e.g., any real number, such as integers or floats). In some embodiments, the received document is one of: an image (e.g., a snapshot) of a receipt (e.g., as the receipt 403 of FIG. 4A through 4D) or an image of an invoice (e.g., the snapshot 502 of FIG. 5A through 5B).

In some embodiments, the plurality of values are received from an OCR component, such as the OCR component 102 of FIG. 1. In some embodiments, prior to the receiving, the OCR functionality includes converting a physical representation of the document into a bitmap image, desaturating the bitmap image, deskewing the bitmap image, removing background noise of the bitmap image, and detecting each word and number, of the plurality of values from the bitmap image and placing (e.g., via extracting) the detected words and numbers into another format (e.g., a JSON string). In some embodiments, such OCR functionality includes any of the functionality as described with respect to the OCR component 102 of FIG. 1.

Per block 604, the user device receives one or more keywords associated with the document. For example, in response to detecting the type of document (e.g., an invoice or receipt), a function stored at the user device may access a data structure stored to the user device's RAM and fetch some or each of the keywords, "name," "address," "amount," "invoice number," or "invoice date." In another example, the user device receives a user-defined keyword. In some embodiments, block 604 includes any of the functionality as described with respect to the keyword detector 104 of FIG. 1.

Per block 606, the user device determines a location of each value. For example, the user device may receive, from the OCR component 102, the X,Y coordinates of each parsed value, which is indicative of where each value is located at the document. In some embodiments, block 606 additionally or alternatively or additionally includes determining, at the document, the location of each value, of the plurality of values, relative to one or more indications of the one or more keywords. In other words, these embodiments compare a location of each value with a location of each indication of each keyword. As described above, an "indication" can refer to the keyword itself (e.g., "amount") or semantically related word (e.g., "total"), since the document may not always contain the exact same keyword. In some embodiments, block 606 includes determining whether each value is vertically aligned to the one or more indications or whether each values is horizontally aligned to the one or more indications. In some embodiments, block 606 includes using an overlap function to detect whether each values is within a threshold height of the one or more indications and further based on detecting a distance between the one or more indicators and each value, as described, for example, with respect to the alignment component 118-1 and the distance component 118-2. In some embodiments, block 606 includes any of the functionality as described with respect to the location component 118 of FIG. 1.

Per block 608, based at least in part on the location, the user device automatically generates a first score for each value. However, in some embodiments, the first score need not be based in part on or related to location but can be any score described herein, such as described with respect to the natural language value scorer 120 (e.g., a score that indicates whether a value contains a dollar sign symbol). In some embodiments, the first score is at least partially indicative of whether each respective value is within a threshold position relative to the one or more indications at the document. For example, "threshold position" can refer to a threshold Euclidian or Cosine distance. In another example, "threshold position" can refer to a threshold alignment position, such as whether each value is vertically or horizontally aligned to an indication of a keyword. In some embodiments, the generation of the first score excludes, sending, over a computer network, a request to one or more remote computing devices (e.g., a server or cloud) to generate the first score. Rather, the scoring is done natively and locally at the user device.

In some embodiments, the location of each value is associated with a first rule. For example, the generation of the first score and the first rule is based on whether each value is vertically aligned to the one or more indicators or whether each value is horizontally aligned to the one or more indicators. For instance, the first score can be directly proportional to the how aligned the value and indication is in 2D space at the document, where the more they are aligned, the higher the score and the further apart they are, the lower the score. In another example, the generating of the first score and the first rule can be based on using an overlap function to detect whether each value is within a threshold height of the one or more indications and further based on detecting a distance between the one or more indications and each value. For instance, the first score can be inversely proportional to the differences in height between each value and indication in 2D space at the document, where the closer they are in height, the higher the score and the further apart they are in height the lower the score. For example, a center point of the indication may be a distance of 2 higher than a first value but a center point of the same indication may be a distance of 6 higher than another value. Accordingly, the first value may be scored higher since its height distance is less than the other value.

In some embodiments, the generating of the first score at block 608 (and/or the second score) alternatively or additionally includes using one or more compressed machine learning models at the user device. For example, in some embodiments, the first score can be a distance (e.g., Euclidian or Cosine) or confidence level prediction (e.g., the predicted key-value pairings of the outputs 308) made by the encoder 306, as described with respect to FIG. 3.

Per block 610, the user device generates a second score for each value. In some embodiments, the generation of the second score excludes sending, over a computer network, another request to the one or more computing device to generate the second score. In some embodiments, an automatic generation of the second score at block 610 is based at least in part on a second rule. For example, if the one or more keywords includes a date, the second rule includes a policy to increment the second score if there is at least one of: a forward slash symbol, a dash symbol, a month indicator, or a year indicator in each value. In another example, the one or more keywords may include a total amount, and the second rule includes a policy to increment the second score if there is at least one of: a dollar sign symbol, a number, a decimal point, or a currency code (e.g., EUR, USD) in each value. In another example, the one or more keywords may include "name" and the second rule includes a policy to increment the second score if there is at least one of: a consecutive threshold (e.g., 2) of natural language letters, an address directly beneath the value, refers to a place entity (e.g., as determined via NER), is at the top half of a document, is next to a logo, etc. In another example, the one or more keywords may include "invoice number" and the second rule includes a policy to increment the second score if there is at least one of: a consecutive number threshold (e.g., 3) without any interceding symbols (e.g., forward slash) or other characters, a dash, etc.

In some embodiments, the generating of the first score and second score is based on using a heuristic algorithm at the user device and excludes using any machine learning model at the user device. In some embodiments, the heuristic algorithm includes any functionality as described with respect to the key-value rules component(s) 106 and/or the location rules component 118 of FIG. 1. A heuristic algorithm solves a problem more quickly relative to classic methods or machine learning techniques and finds an approximate solution (as opposed to an exact solution). In this way, accuracy, optimality, or precision, is traded for speed. In some embodiments, the generating of the second score is based on at least one of: a font size of each value, a font type of each value (e.g., Times New Roman), and a character type of each value (e.g., number v. letter).

Per block 612, the user device generates a third score by aggregating (e.g., multiplying, summing, and/or subtracting) at least the first score and the second score for each value. For example, the first score may indicate a location of X for a first value to produce a first score. The second score may indicate that the first value has a first symbol to produce a second score. A third score may indicate that the first value has a second symbol to produce a third score. Each of the first, second, and third scores may be added up together to produce a total score.

In some embodiments, the user device additionally generates a fourth score for the one or more indications of the one or more keywords in order to identify or determine the one or more indications at the document. In some embodiments, the generating of the fourth score is based on whether the one or more indications match keywords in a data structure. For example, as described with respect to the keyword detector 104, "matching" can determining whether an indication contains a syntactic match to a keyword (e.g., via TF-IDF) or whether the indication matches the same semantic meaning of the keyword even if they are not syntactically identical (e.g., via NLP).

In some embodiments, the generating of the fourth score is additionally or alternatively based on whether the one or more indications are isolated or are a part of a larger string of characters. For example, a rule may state that if the value "total" is not part of any other natural language phrase or sentence (e.g., as determined via NLP) or outside of a threshold distance (e.g., horizontal distance) away from any other natural language word, then the score is incremented higher to qualify as an indication, whereas the rule states that if the value "total" is part of another natural language phrase or sentence or inside of a threshold distance away from other natural language words, then the score is incremented lower so as to not be selected as an indication.

Per block 614, based on the third score, the user device ranks each value, of the plurality of values. Alternatively, in some embodiments, based on the generating of the first score or second score, each value is ranked. In some embodiments, the ranking of each value also excludes sending, over the computer network, a second request to the one or more remote computing devices to rank each value. In this way the ranking is done natively and locally at the user device. In some embodiments, such ranking at block 614 is done for each keyword and each value. In this way, the higher the ranking of a value, the more indicative or likely that the value belongs to or is otherwise a constituent of a particular keyword. In an illustrative example, for a keyword "amount," a first value of "$100.00" may be ranked higher than the second value "date" because the first value includes a higher score (reflecting a dollar sign, decimal point, integer, and lower distance to the keyword relative to the second value) relative to the value date (which has no dollar sign, decimal point, integer, and is a farther distance away from the keyword relative to the first value).

Per block 616, based on the ranking, the user device selects at least one value, of the plurality of values. In some embodiments, such selection is indicative that the at least one values is a candidate to be a constituent of the one or more keywords. For example, where the keyword includes the word "date," the user device can select the highest ranked value—"11/16/1981"—which is indicative that the value is candidate to be a date. In another example, where the keyword includes the word "amount," the user device can select the two highest ranked values—"30.00" and "$50.00"—which is indicative that these values are candidates to be total amounts. In some embodiments, the selecting also excludes sending, over the computer network, a third request to the one or more remote computing devices to select the value. In this way the selection is done natively and locally without communicating externally.

In some embodiments, the process 600 includes another block after block 616, where the user device presents an indicator at the user device based on the selecting. In some embodiments, the indicator also indicates that the at least one value is the candidate to be the constituent of the one or more keywords. For example, the user device can display, at a user interface, each key-value pair. In an illustrative example of this block, the presenting of the indicator can include superimposing colored pixel values (the indicator) over that at least one value in an image of the document, where the colored pixel values indicate that the at least one value is the candidate to be the constituent of the one or more keywords. One example of this is described with respect to the VR overlay 420 of FIG. 4D, which indicates that "Mulberry's Market" is likely a constituent of the "name" keyword. In another example of this block, the indicator can be the "Name: Mulberry's Market" indicia in the key-vale pairs 440, which indicates that "Mulberry's Market" is likely a constituent of the "name" keyword. In some embodiments, "presenting" the indicator includes displaying the indicator (e.g., at a graphical user interface or natural user interface) or emitting an audio signal, such as the name of the value and keyword.

Figure 7:
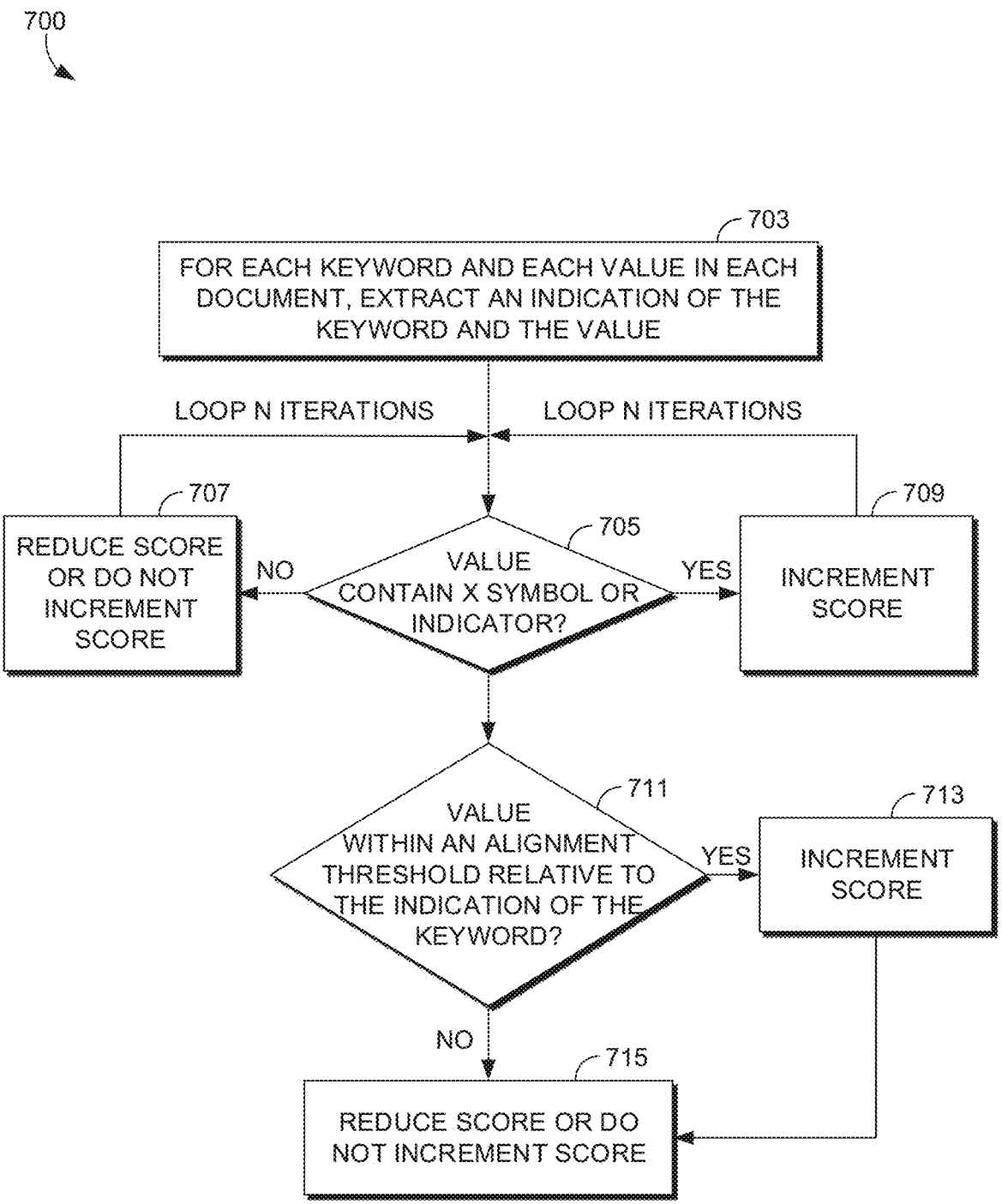
FIG. 7 is a flow diagram of an example process for incrementing or reducing a score, according to some embodiments.

FIG. 7 is a flow diagram of an example process 700 for incrementing or reducing a score, according to some embodiments. Such functionality can be included in the natural language value scorer 120 of FIG. 1, block 608, block 610, and/or block 612 of FIG. 6. Per block 703, for each keyword and each value in each document, particular embodiments extract an indication of the keyword and extract the value. For example, the keyword detector 104 can extract, from a JSON string populated via the OCR component 102, each value of a document and then locate a semantically similar word (the "indication") at a document relative to the keyword.

Per block 705, some embodiments determine whether the value contains X symbol or indicator. "X" symbol can be any suitable symbol, such as a dollar sign symbol ($), decimal point (.), forward slash (/), or the like. An indicator may represent any character sequence, font type, font size, or the like. If the value does contain X symbol or indicator, then, per block 709, a score is incremented (e.g., generated or added to), which is indicative that the value is a constituent of the keyword. If the value does not contain X symbol or indicator, then, per block 707, the score is reduced or not incremented, which is indicative that the value is not a constituent of the keyword. Block 705 is iterated in loop an N number of times depending on the different rules or policies of the algorithm regarding different symbols or indicators. For example, at a second iteration, it can be determined whether the same value contains Y symbol, such as a decimal point (.), forward slash (/), or month indicator ("Mar.") and the score is either incremented or reduced based on these determinations.

Per block 711, it is determined whether the value is within an alignment threshold relative to the indication of the keyword. In some embodiments, this includes the functionality as described with respect to the alignment component 118-1 and/or the distance component 118-2 of FIG. 1. Per block 713, if the value is within the alignment threshold, the score produced at block 707 and/or 709 is incremented, which is indicative that the value is a constituent of the keyword. However, if the value is not within or outside of the alignment threshold relative to the indication of the keyword, then, per block 715, the score produced at block 707 and/or 709 is reduced or not incremented, which is indicative that the value is not a constituent of the keyword.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 8:
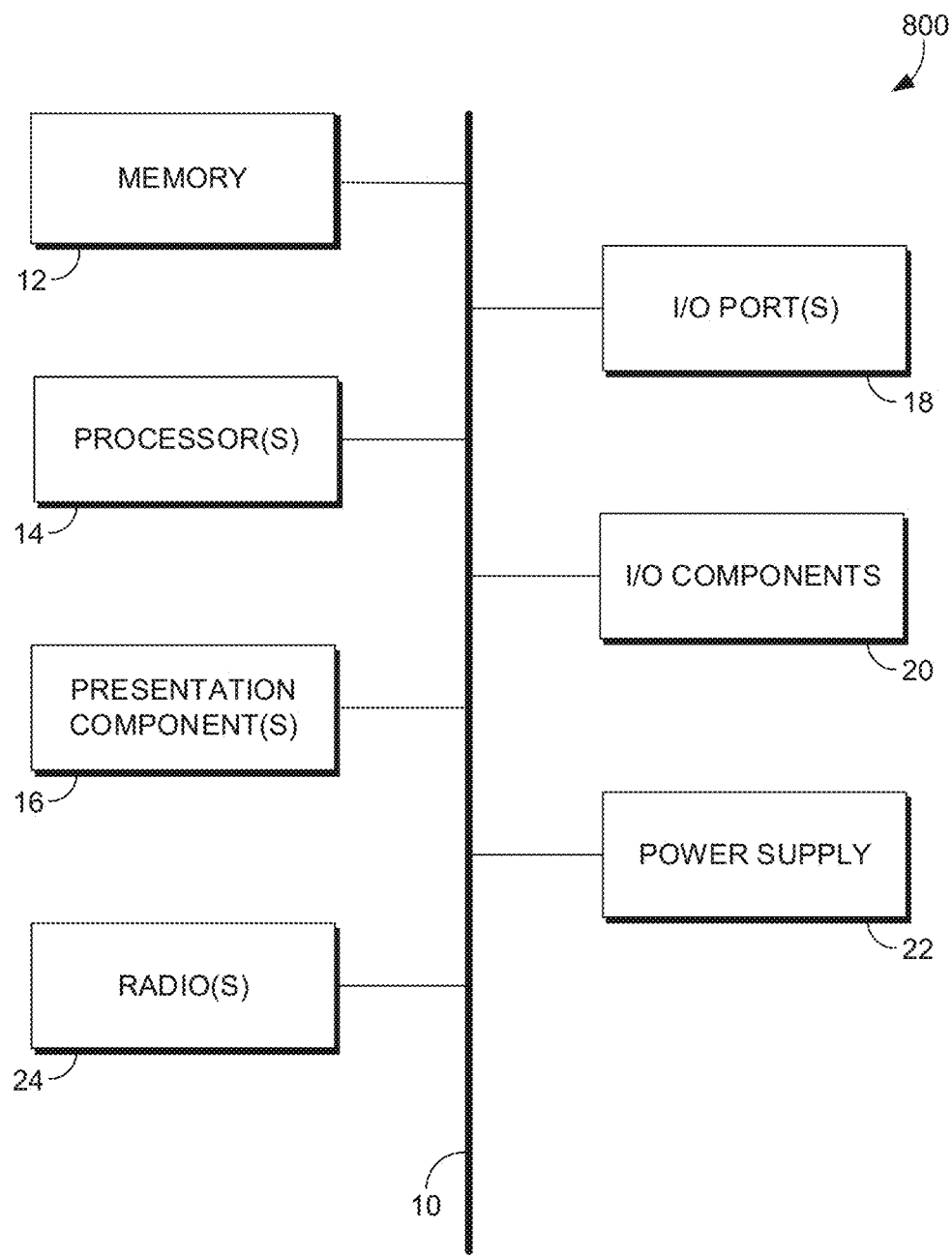
FIG. 8 is a block diagram of a computing device in which aspects of the present disclosure are implemented within, according to some embodiments.

With reference to FIG. 8, computing device 800 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

In some embodiments, the computing device 800 represents the physical embodiments of one or more systems and/or components described above. For example, the computing device 800 can represent the user device 101 of FIG. 1. The computing device 800 can also perform some or each of the blocks in the process 600, 700, and/or any functionality described herein with respect to FIGS. 1-7. It is understood that the computing device 800 is not to be construed necessarily as a generic computer that performs generic functions. Rather, the computing device 700 in some embodiments is a particular machine or special-purpose computer. For example, in some embodiments, the computing device 700 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 14 that read data from various entities such as memory 12 or I/O components 20 (e.g., an image sensor). Presentation component(s) 16 present data indications to a user or other device. Exemplary presentation components include a display device, speaker, printing component, vibrating component, etc.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for capturing snapshots of documents, gesture detection, or recognition. Additionally, the computing device 800 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors of a user device; and
   computer storage memory of the user device, the computer storage memory having computer-executable instructions stored thereon which, when executed by the one or more processors, implement operations comprising:
   receiving a plurality of values, each value, of the plurality of value having been parsed from a document via optical character recognition (OCR) of the document, the plurality of values including one or more natural language word characters and one or more numerical characters;
   receiving one or more keywords associated with the document;
   determining, at the document, a location of each value, of the plurality of values, relative to one or more indications of the one or more keywords;
   based at least in part on the location, automatically generating a first score for each value, of the plurality of values, the first score being at least partially indicative of whether each respective value is within a threshold position relative to the one or more indications at the document, the generation of the first score excluding sending, over a computer network, a request to one or more remote computing devices to generate the first score, the location of each value being associated with a first rule;
   based at least in part on a second rule, automatically generating a second score for each value, of the plurality of values, the generation of the second score excluding sending, over a computer network, another request to the one or more computing devices to generate the second score;

generating, by aggregating the first score and the second score, a third score for each value, of the plurality of values;

based on the generating of the third score, ranking each value, of the plurality of values;

based on the ranking, selecting at least one value, of the plurality of values, the selecting being indicative that the at least one value is a candidate to be a constituent of the one or more keywords; and based on the selecting the at least one value, of the plurality of values, presenting an indicator at the user device, the indicator indicating that the at least one value is the candidate to be the constituent of the one or more keywords by superimposing colored pixel values over the at least one value in an image of the document, and wherein the colored pixel values indicate that the at least one value is the candidate to be the constituent of the one or more keywords.

2. The system of claim 1, wherein the one or more keywords includes a date, and wherein the second rule includes a policy to increment the second score if there is at least one of: a forward slash symbol, a dash symbol, a month indicator, or a year indicator in each value, of the plurality of values, and wherein the selecting is indicative that the at least one values is a candidate to be the date.

3. The system of claim 1, wherein the one or more keywords includes a total amount, and wherein the second rule includes a policy to increment the second score if there is at least one of: a dollar sign symbol, a number, a decimal point, or a currency code in each value, of the plurality of values, and wherein the selecting is indicative that the at least one value is a candidate to be the total amount.

4. The system of claim 1, wherein the document is an image of one of: a receipt or invoice.

5. The system of claim 1, wherein the operations further comprise, prior to the receiving:
converting a physical representation of the document into a bitmap image;
desaturating the bitmap image;
deskewing the bitmap image;
removing background noise of the bitmap image; and
detecting each word and number, of the plurality of values, from the bitmap image and place the detected word and number into another format.

6. The system of claim 1, wherein the generating of the first score and the second score is based on using a heuristic algorithm at the user device and excluding from using a machine learning model at the user device.

7. The system of claim 1, wherein the generating of the first score and the first rule is based on whether each value is vertically aligned to the one or more indications or whether each value is horizontally aligned to the one or more indications.

8. The system of claim 1, wherein the generating of the second score is based at least in part on one of: a font size of each value, a font type of each value, and a character type of each value.

9. The system of claim 1, wherein the generating of the first score and the first rule is based on using an overlap function to detect whether each value is within a threshold height of the one or more indications and further based on detecting a distance between the one or more indications and each value, of the plurality of values.

10. The system of claim 1, wherein the operations further comprising generating a fourth score for the one or more indications based on whether the one or more indications match corresponding keywords in a data structure and further based on whether the one or more indications are isolated or are a part of a larger string of characters.

11. The computer-implemented method of claim 10, wherein the generating of the first score and the second score includes using one or more compressed machine learning models stored at the user device, and wherein the user device is a mobile device.

12. A computer-implemented method comprising:
receiving, by a user device, a plurality of values associated with a document, the plurality of values including one or more natural language words and one or more numerical characters;
receiving, by the user device, one or more keywords associated with the document, the one or more key words includes a total amount;
determining, by the user device, a location of each value, of the plurality of values;
based at least in part on the location, automatically generating, by the user device, a first score for each value, of the plurality of values, the generation of the first score excluding sending, over a computer network, a request to one or more remote computing devices to generate the first score;
determining a rule that includes a policy to increment a score when there is at least one of: a dollar sign symbol, a number, a decimal point, or a currency code in a value, of the plurality of values;
based on the rule, generating, by the user device, a second score for each value, of the plurality of values,
generating, by the user device and by aggregating the first score and the second score, a third score for each value, of the plurality of values;
based on the generating of the third score, ranking, by the user device, each value, of the plurality of values;
based on the ranking, selecting, by the user device, at least one value, of the plurality of values, the selecting being at least partially indicative that the at least one value is a candidate the total amount; and
based on the selecting, presenting, by the user device, an indicator at the user device, the indicator indicating that the at least one value is the the total amount.

13. One or more non-transitory computer storage media having computer-executable instructions embodied thereon that, when executed, by one or more processors, cause the one or more processors to perform operations comprising:
receiving a plurality of values associated with a document;
receiving one or more keywords associated with the document, wherein the one or more keywords includes a date;
determining a rule that includes a policy to increment a score if there is at least one of: a forward slash symbol, a dash symbol, a month indicator, or a year indicator in a value, of the plurality of values;
based on the rule, generating a first score for each value, of the plurality of values, the generation of the first score excluding sending, over a computer network, a first request to one or more remote computing devices to generate the first score;
based at least in part on the generating of the first score, ranking each value, of the plurality of values, the ranking of each value excluding sending, over the computer network, a second request to the one or more remote computing devices to rank each value;

based on the ranking, selecting at least one value, of the plurality of values, the selecting being at least partially indicative that the at least one value is a candidate to be the date, the selecting excluding sending, over the computer network, a third request to the one or more remote computing devices to select the value; and based on the ranking and the selecting, presenting an indicator indicating that the at least one value is the candidate to be the date.

14. The computer storage media of claim 13, wherein the one or more keywords includes a date, and wherein a rule includes a policy to increment the first score if there is at least one of: a forward slash symbol, a dash symbol, a month indicator, or a year indicator in each value, of the plurality of values, and wherein the selecting is indicative that the at least one values is a candidate to be the date.

15. The computer storage media of claim 13, wherein the document is an image of one of: a receipt or invoice.

16. The computer storage media of claim 13, wherein the operations further comprise, prior to the receiving of the plurality of values:
converting a physical representation of the document into a bitmap image;
desaturating the bitmap image;
deskewing the bitmap image;
removing background noise of the bitmap image; and
detecting each word and number, of the plurality of values, from the bitmap image and place the detected word and number into another format.

17. The computer storage media of claim 13, wherein the generating of the first score and a second score is based on using a heuristic algorithm at the user device and excluding from using a machine learning model at the user device.

18. The computer storage media of claim 13, wherein the generating of the first score and a first rule is based on whether each value is vertically aligned to one or more indications of the one or more keywords at the document or whether each value is horizontally aligned to the one or more indications at the document.

* * * * *